(12) United States Patent
Chittilappilly et al.

(10) Patent No.: US 11,288,684 B2
(45) Date of Patent: *Mar. 29, 2022

(54) PERFORMING INTERACTIVE UPDATES TO A PRECALCULATED CROSS-CHANNEL PREDICTIVE MODEL

(71) Applicant: Visual IQ, INC., Needham, MA (US)

(72) Inventors: Anto Chittilappilly, Waltham, MA (US); Payman Sadegh, Alpharetta, GA (US); Madan Bharadwaj, Billerica, MA (US); Darius Jose, Thrissur (IN); Rakesh Pillai, Kerala (IN)

(73) Assignee: The Nielsen Company (US), LLC, New York, NY (US)

( * ) Notice: Subject to any disclaimer, the term of this patent is extended or adjusted under 35 U.S.C. 154(b) by 560 days.

This patent is subject to a terminal disclaimer.

(21) Appl. No.: 14/322,353

(22) Filed: Jul. 2, 2014

(65) Prior Publication Data

US 2015/0186926 A1 Jul. 2, 2015

Related U.S. Application Data

(63) Continuation of application No. 14/145,625, filed on Dec. 31, 2013, now abandoned.

(51) Int. Cl.
*G06Q 30/02* (2012.01)
*G06N 20/00* (2019.01)
*G06N 5/04* (2006.01)

(52) U.S. Cl.
CPC ........... *G06Q 30/0201* (2013.01); *G06N 5/04* (2013.01); *G06N 20/00* (2019.01); *G06Q 30/0242* (2013.01); *G06Q 30/0243* (2013.01)

(58) Field of Classification Search
CPC ........... G06Q 30/0243; G06Q 30/0201; G06Q 30/0242; G06N 20/00; G06N 5/04
See application file for complete search history.

(56) References Cited

U.S. PATENT DOCUMENTS 7,370,003 B2 5/2008 Pych
7,949,561 B2 5/2011 Briggs
(Continued)

OTHER PUBLICATIONS

Wiley Encyclopedia of Computer Science and Engineering (Year: 2009).*

(Continued)

*Primary Examiner* — Breffni Baggot
(74) *Attorney, Agent, or Firm* — Hanley, Flight & Zimmerman, LLC

(57) ABSTRACT

A computer-implemented method, simulation and prediction system, and computer program product for advertising portfolio management. Embodiments commence upon receiving data comprising a plurality of marketing stimulations and respective measured responses, both pertaining to a first time period. A computer is used to form a multi-channel simulation model, where the simulation model accepts the marketing stimulations then outputs simulated responses. The simulation model is used for determining cross-channel weights to apply to the respective measured responses pertaining to the first time period. The simulation model is updated to reflect updated marketing stimulations pertaining to a second time period. The updated marketing stimulations overwrite some of the plurality of marketing stimulations captured in the first time period. The updated simulation model is used in calculating an effectiveness value of a particular one of the updated marketing stimulations based at least in part on the cross-channel weights determined for the first time period.

20 Claims, 22 Drawing Sheets

(56) References Cited

U.S. PATENT DOCUMENTS

| | | | |
|---|---|---|---|
| 8,103,663 B2 | 1/2012 | Nishida | |
| 8,244,571 B2 | 8/2012 | Cavander | |
| 8,321,273 B2 | 11/2012 | Briggs | |
| 8,417,560 B2 | 4/2013 | Woods | |
| 8,423,406 B2 | 4/2013 | Briggs | |
| 8,423,539 B2 | 4/2013 | Nishida | |
| 8,468,045 B2 | 6/2013 | Cavander | |
| 8,473,343 B2 | 6/2013 | Chalimadugu | |
| 8,533,825 B1 | 9/2013 | Marsa | |
| 8,561,184 B1 | 10/2013 | Marsa | |
| 8,676,647 B2 | 3/2014 | Crites | |
| 8,738,440 B2 | 5/2014 | Crites | |
| 8,762,874 B2 | 6/2014 | Hong | |
| 8,768,943 B2 | 7/2014 | Puttaswamy | |
| 8,775,248 B1 | 7/2014 | Saldanha | |
| 8,788,339 B2 | 7/2014 | Hughes | |
| 8,862,498 B2 | 10/2014 | Crites | |
| 9,183,562 B2 | 11/2015 | Chittilappilly | |
| 2007/0156673 A1* | 7/2007 | Maga | G06Q 30/02 |
| 2007/0282859 A1 | 12/2007 | Charvet | |
| 2008/0162281 A1 | 7/2008 | Davis | |
| 2008/0235073 A1 | 9/2008 | Cavander | |
| 2009/0089152 A1 | 4/2009 | Davis | |
| 2009/0144117 A1 | 6/2009 | Cavander | |
| 2009/0216597 A1 | 8/2009 | Cavander | |
| 2010/0036700 A1 | 2/2010 | Cavander | |
| 2010/0036722 A1 | 2/2010 | Cavander | |
| 2010/0042387 A1 | 2/2010 | Gibbon | |
| 2010/0042477 A1 | 2/2010 | Cavander | |
| 2010/0211455 A1* | 8/2010 | Williams | G06Q 30/0243 705/14.42 |
| 2010/0332311 A1 | 12/2010 | Jilk | |
| 2011/0010211 A1 | 1/2011 | Cavander | |
| 2011/0071900 A1 | 3/2011 | Kamath et al. | |
| 2011/0173047 A1 | 7/2011 | Kelley | |
| 2011/0307509 A1 | 12/2011 | Hsiao | |
| 2012/0029987 A1 | 2/2012 | Kusumoto | |
| 2012/0046991 A1* | 2/2012 | Bai | G06Q 30/02 705/7.29 |
| 2012/0054021 A1* | 3/2012 | Kitts | G06Q 30/0254 705/14.42 |
| 2012/0109882 A1 | 5/2012 | Bouse | |
| 2012/0116787 A1* | 5/2012 | Crites | G06Q 30/02 705/1.1 |
| 2012/0290371 A1 | 11/2012 | Crites | |
| 2012/0290373 A1 | 11/2012 | Ferzacca | |
| 2012/0303447 A1 | 11/2012 | Hughes et al. | |
| 2013/0035975 A1 | 2/2013 | Cavander | |
| 2013/0085808 A1* | 4/2013 | Forbes | G06Q 30/02 705/7.32 |
| 2013/0124302 A1 | 5/2013 | Briggs | |
| 2013/0166364 A1 | 6/2013 | Kusumoto | |
| 2013/0211910 A1 | 8/2013 | Yerli | |
| 2013/0332223 A1 | 12/2013 | Cavander | |
| 2013/0346185 A1 | 12/2013 | Chalimadugu | |
| 2014/0067518 A1 | 3/2014 | Mcgovern | |
| 2014/0074587 A1 | 3/2014 | Briggs | |
| 2014/0081740 A1 | 3/2014 | Lipka | |
| 2014/0100947 A1 | 4/2014 | Kitts et al. | |
| 2014/0188596 A1 | 7/2014 | Nangle, III | |
| 2014/0188597 A1 | 7/2014 | Nangle, III | |
| 2014/0195339 A1 | 7/2014 | Paulsen | |
| 2014/0244345 A1 | 8/2014 | Sollis | |
| 2014/0244380 A1 | 8/2014 | Willeitner | |
| 2014/0278620 A1 | 9/2014 | Khan | |
| 2014/0278622 A1 | 9/2014 | Chen | |
| 2014/0324567 A1 | 10/2014 | Saldanha et al. | |
| 2014/0379490 A1 | 12/2014 | Schnabl | |
| 2015/0186924 A1 | 7/2015 | Chittilappilly | |
| 2015/0186925 A1 | 7/2015 | Chittilappilly et al. | |
| 2015/0220971 A1 | 8/2015 | Raj | |
| 2015/0317670 A1* | 11/2015 | Cavander | G06Q 30/0273 705/14.41 |
| 2016/0063427 A1 | 3/2016 | Xu et al. | |
| 2016/0098735 A1 | 4/2016 | Sinha et al. | |
| 2017/0300832 A1 | 10/2017 | Chittilappilly et al. | |

OTHER PUBLICATIONS

Approaches to Machine Learning, P. Langley at Carnegie-Mellon University (Year: 1984).*

United States Patent and Trademark Office, "Non-Final Office Action," issued in connection with U.S. Appl. No. 14/145,625, dated Oct. 7, 2016, 10 pages.

United States Patent and Trademark Office, "Final Office Action," issued in connection with U.S. Appl. No. 14/145,625, dated Feb. 23, 2017, 14 pages.

United States Patent and Trademark Office, "Non-Final Office Action," issued in connection with U.S. Appl. No. 15/603,352, dated Aug. 10, 2017, 21 pages.

Statistical Techniques by Douglas Lind (2009) Time Series Chapter 16 (McGraw-Hill).

United States Patent and Trademark Office, "Final Office Action", issued in connection with U.S. Appl. No. 15/603,352, filed Feb. 12, 2018, (25 pages).

MBA Lectures, "How to Calculate Correlation Coefficient," Descriptive statistics, Jun. 16, 2010, [online] available at: https://mba-lectures.com/statistics/descriptive-statistics/380/correlation.html, (8 pages).

* cited by examiner

| Channel | Stimulus in a Channel (spend) | Response in the Same Channel (observations) | True Response Based on True Scores | |
|---|---|---|---|---|
| | Spend | Observed Verification | TrueVerification | % TrueVerification |
| TVOther | $ 1,099,775 | $ 49,767 | $ 137,112 | 16.3% |
| TVSynd | $ 219,376 | $ 12,252 | $ 100,801 | 12.0% |
| TVBET | $ 2,382,034 | $ 104,589 | $ 433,725 | 51.7% |
| Display | $ 255,728 | $ 2,957 | $ 35,086 | 4.2% |
| Search | $ 1,098,583 | $ 86,298 | $ 49,902 | 5.9% |
| Organic | | $ 583,078 | $ 82,314 | 9.8% |
| Response Channels | $ 3,148,373 | | | 0.0% |
| Q4/2010-Q3/2011 Total | $ 8,203,868 | $ 838,941 | $ 838,941 | 100.0% |

FIG. 11

| Week | Display Stimulus | Search Stimulus | TV BET Stimulus | TV Other Stimulus | TV Synd Stimulus | TV BET Response | TV Other Response | TV Synd Response | Display Response |
|---|---|---|---|---|---|---|---|---|---|
| 03-Sep-2012 | 22677.00 | 3003.00 | 82344.00 | 64785.00 | 16058.00 | 2274.00 | 943.00 | 219.00 | 295.00 |
| 10-Sep-2012 | 32084.00 | 32636.00 | 89394.00 | 85625.00 | 18788.00 | 2489.00 | 1308.00 | 299.00 | 304.00 |
| 17-Sep-2012 | 31536.00 | 34129.00 | 84816.00 | 64906.00 | 18886.00 | 2498 | 1226.00 | 308.00 | 266.00 |
| 24-Sep-2012 | 28427.00 | 33053.00 | 101678.00 | 41350.00 | 17716.00 | 2502.00 | 1083 | 153.00 | 276.00 |
| 01-Oct-2012 | 17452.00 | 35756.00 | 84600.00 | 86444.00 | 14571.00 | 2659.00 | 1320.00 | 122.00 | 310.00 |
| 08-Oct-2012 | 19453.00 | 29946.00 | 82344.00 | 44451.00 | 11159.00 | 2618.00 | 1085.00 | 119.00 | 301.00 |

Week-by-Week Granularity 1302
Stimulus by Channel 1304
Response by Channel 1306
Input 03-Sep-2012 To 24-Dec-2012 ▶ Clear

|    | R1    | R2    | R3    | R4    | ... | RN    |
|----|-------|-------|-------|-------|-----|-------|
| S1 | WS1R1 | WS1R2 | WS1R3 | WS1R4 |     | WS1RN |
| S2 | WS2R1 | WS2R2 | WS2R3 | WS2R4 |     | WS2RN |
| S3 | WS3R1 | WS3R2 | WS3R3 | WS3R4 |     | WS3RN |
| S4 | WS4R1 | WS4R2 | WS4R3 | WS4R4 |     | WS4RN |
| ... |      |       |       |       |     |       |
| SN | WSNR1 | WSNR2 | WSNR3 | WSNR4 |     | WSNRN |

FIG. 14

PERFORMING INTERACTIVE UPDATES TO A PRECALCULATED CROSS-CHANNEL PREDICTIVE MODEL

RELATED APPLICATIONS

This patent application claims benefit to the U.S. patent application entitled "MEDIA SPEND OPTIMIZATION USING A CROSS-CHANNEL PREDICTIVE MODEL", having Ser. No. 14/145,625 filed on Dec. 31, 2013, which is hereby incorporated by reference in its entirety.

FIELD OF THE INVENTION

The disclosure relates to the field of advertising portfolio management and more particularly to techniques for performing interactive updates to a precalculated cross-channel predictive model.

BACKGROUND

Advertising is big business. In today's global commerce arena, business managers must consider how to tout their products or services using various types of advertising. And, in the hyper-media world in which we live there is a dizzying and ever-changing array of possibilities to spend on advertising (e.g., TV, radio, print, mail, web, etc.). Often an advertising campaign will use multiple channels to establish brand awareness to entice and convert advertising into action.

For managing spend on advertising, advertisers want to know quite specifically how a particular ad placement resulted in a particular behavior by the viewer. In the domain of internet advertising, the details such as the location where the ad was placed, the time of day the ad was placed, responses or actions taken after the placement (e.g., click on an ad or coupon) or, in some cases, very precise demographics of the respondent can be known, and can thus be delivered to the advertiser. However when using many other forms of media, it is often collectable only in aggregate. Yet, advertisers strongly desire a level of precision in the form of a specific placement, and the respective answers to "who, what, when" can be used by advertisers to tune their creatives and/or tune their placements.

In many forms of advertising media, clever placements can yield a relationship between stimulus and response (even if only measurable in aggregate). For example, a radio ad in the form of "Call 1-800-123-4567 today for this buy-1-get-two-free offer" might be broadcast to three million morning commuters, but which specific commuters have heard the spot cannot be determined directly. Indirectly, however, one can measure the effectiveness of the spot by tallying the number of calls into the broadcasted telephone number "1-800-123-4567".

Prior to the advent of internet advertising, a common expression repeated in advertising circles was, "Half the money I spend on advertising is wasted; the trouble is I don't know which half." This expression (often attributed to John Wanamaker, b. 1838) illustrates how difficult it is to measure the effectiveness of traditional broadcast or mass advertising.

What is needed is a technique or techniques that consider media effectiveness, including cross-channel effects and constraints. Further, what is needed is a technique or techniques that consider cross-channel effects and that can perform interactive updates to a cross-channel predictive model. There is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for performing interactive updates to a precalculated cross-channel predictive model.

Embodiments commence upon receiving data comprising a plurality of marketing stimulations and respective measured responses pertaining to a first time period. A computer is used to form a multi-channel simulation model, where the simulation model accepts the marketing stimulations and outputs simulated responses. The simulation model is used for determining cross-channel weights to apply to the respective measured responses pertaining to the first time period. The simulation model is updated to reflect updated marketing stimulations pertaining to a second time period. The updated marketing stimulations overwrite at least some of the plurality of marketing stimulations captured in the first time period. The updated simulation model is used in calculating an effectiveness value of a particular one of the updated marketing stimulations based at least in part on the cross-channel weights determined for the first time period.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 11 depicts a true metrics report based on the true scores, according to some embodiments.

FIG. 13B depicts an interactive user interface for capturing updated vectors formed from a time-series of updated scalars, according to some embodiments.

FIG. 14 depicts a diagrammatic representation of a weight matrix as used in calculating true scores, according to some embodiments.

DETAILED DESCRIPTION

Overview

Figure 1A:
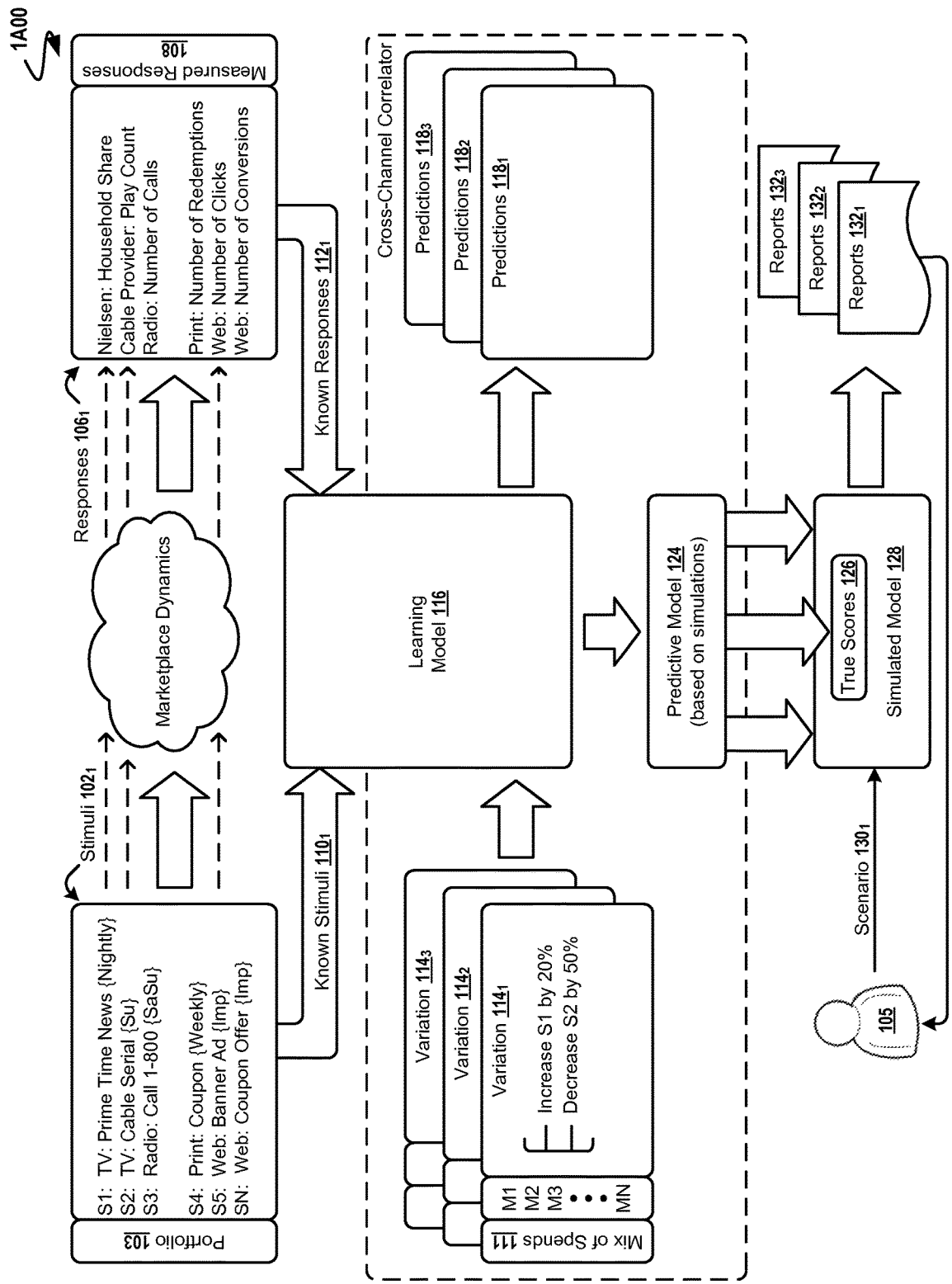
FIG. 1A depicts an environment for practicing media spend optimization using a cross-channel predictive model, according to some embodiments.

Some advertising channels capture a direct correspondence between a placement and an action, and some do not. For example, contrast a TV ad placement with a web page ad (e.g., banner ad, display ad, click-on coupon, etc.). In the web page case, the precise distribution of the internet ad placements can be determined by the internet ad network provider since at the time an internet ad is displayed, quite a lot is known about the placement as well as the respondent. In the TV case, while it can be known that the ad placement was broadcast, it might not be known precisely who saw the ad. Perhaps only the share of households watching the program can be known. Indeed, in many forms of advertising media, stimulus and response can be measured only indirectly or can be determined only in aggregate. For example, a radio ad in the form of "Call 1-800-123-4567 today for this buy-1-get-two-free offer" might be broadcast to three million morning commuters, but which specific commuters have heard the spot cannot be determined directly. Indirectly, however the effectiveness of the spot can be measured by tallying the number of calls into "1-800-123-4567". Or, again indirectly, the effectiveness of the spot can be measured by running an experiment to see if an increase in the frequency of the radio spots entices commensurately more listeners to send in a "prepaid inquiry postcard" they received in a direct mailing.

The problem of determining the effect of one or another type of advertising (e.g., by media, by channel, by time of day, etc.) has long been studied, yet legacy approaches fall short. Legacy approaches rely on a naïve one-to-one correspondence between an advertising placement and a measured response. If an increase in a particular spend (e.g., on radio spots) results in more responses (e.g., more calls to the broadcasted 1-800 number) then a legacy approach would recommend to the advertiser to increase spend on those radio spots. Conversely, if spending on direct mailings did not return any leads, then a legacy approach would recommend to the advertiser to decrease or eliminate spending on such direct mailings. Such legacy approaches are naïve in at least that they fail to consider the following aspects:

Cross-channel influence from more spending. For example, the effect of spending more on TV ads might influence viewers to "log in" (e.g., to access a website) and take a survey or download a coupon.

Cross-channel effects that are counter-intuitive in a single channel model. For example, additional spending on a particular channel often suffers from measured diminishing returns (e.g., the audience "tunes out" after hearing a message too many times). Placement of a message can reach a "saturation point" beyond which point further desired behavior is not apparent in the measurements in the same channel. However additional spending beyond the single-channel saturation point may correlate to improvements in other channels.

The legacy approaches fail to provide enough responsiveness and interactivity to allow the media portfolio manager to quickly assess changes in the landscape due to passage of time and/or changes in the spending.

An advertiser would want to quickly and accurately predict the overall effectiveness of a particular change to the advertiser's ad placement portfolio, yet legacy prediction models fail to account for the aforementioned cross-channel effects, and legacy prediction models cannot be easily updated to capture recent changes in the prosecution of activities within the advertiser's ad placement portfolio.

Advertisers want to quickly and accurately predict the overall effectiveness of a portfolio of spends. In particular, advertisers want to accurately forecast the overall effectiveness of a mix of advertising spending (e.g., a portfolio of spends) given a proposed change in spending into one or more channels. And advertisers would want to repeat this forecasting of the overall effectiveness of a mix of advertising spending based on new incoming data, and would want to repeat this forecasting again (e.g., a week later) and again (e.g., two weeks later) and again.

Disclosed herein are modeling techniques that consider intra-channel effects (e.g., saturation, amplification) as well as inter- or cross-channel effects and constraints. Also disclosed herein are modeling techniques that result in models that accurately forecast inter- or cross-channel effects and constraints to account for the overall effectiveness of the portfolio, even given recent changes (e.g., "live updates") in the media spending in the various marketing channels that comprise the portfolio.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 100 for practicing media spend optimization using a cross-channel predictive model. As an option, one or more instances of environment 100 or any aspect thereof may be implemented in the context of the architecture and functionality of the embodiments described herein.

One approach to advertising portfolio optimization uses marketing attributions and predictions determined from historical data. Analysis of the historical data can serve to infer relationships between marketing stimulations and responses. In some cases, the historical data comes from "online" outlets, and is comprised of individual user-level data, where a direct cause-and-effect relationship between stimulations and responses can be verified. However, "offline" marketing channels, such as television advertising, are of a nature such that indirect measurements are used when developing models used in media spend optimization. For example, some stimuli are described as an aggregate (e.g., "TV spots on Prime Time News, Monday, Wednesday and Friday") that merely provides a description of an event or events as a time-series of marketing stimulations (e.g., weekly television advertising spends). Responses to such stimuli are also often measured and/or presented in aggregate (e.g., weekly unit sales reports provided by the telephone sales center). Yet, correlations, and in some cases causality and inferences, between stimulations and responses can be determined via statistical methods.

As shown in FIG. 1A, stimuli $102_1$ arise from a portfolio of spends (e.g., portfolio 103). The stimuli comprise various "spots" or "placements" (e.g., TV spots, radio spots, print media mailer, web banner ads, etc.). The stimuli are presented to the marketplace and undergo marketplace dynamics resulting in responses. Generally, and as shown, at least one response measurement is attempted for each stimulus, which attempt may result in one or more measured responses 108. For example, a "TV Prime Time News" placement might be measured by a "Nielsen Household Share" metric.

In collecting historical data, any series of stimuli $102_1$ from portfolio spends can be considered to be known stimuli $110_1$, and any responses $106_1$ from the observations can be considered to be known responses $112_1$. A model (e.g., learning model 116) can be formed using the historical data. The learning model 116 serves to predict a particular channel response from a particular channel stimulation. For example, if a radio spot from last week Saturday and Sunday resulted in some number of calls to the broadcasted 1-800 number, then the mode can predict that additional radio spots next week Saturday and Sunday might result in the same number of calls to the broadcasted 1-800 number. Of course, there are often influences not included in such a model. For example, next Sunday might be Super Bowl Sunday, which might suggest that many people would be watching TV rather than listening to the radio. Such external factors can be included in a learning model, and incorporation of such external factors is further discussed below.

As earlier indicated, what is desired is a model that considers cross-channel effects even when direct measurements are not available. The simulated model 128 is such a model, and can be formed using any machine learning techniques and/or the operations shown in FIG. 1A. Specifically, the embodiment of FIG. 1A shows a technique where variations (e.g., mixes) of stimuli are used with the learning model to capture predictions of what would happen if a particular portfolio variation (e.g., a mix of spends 111) were prosecuted. The learning model 116 produces a set of predictions (e.g., predictions $118_1$, predictions $118_2$, predictions $118_3$, etc.), one set of predictions for each variation (e.g., variation $114_1$, variation $114_2$, variation $114_3$, etc.). In this manner multiple variations of stimuli produce predicted responses, which are used in weighting and filtering operations (e.g., see predictive model 124), which in turn result in a simulated model 128 being output that includes cross-channel predictive capabilities.

A simulated model that includes cross-channel predictive capabilities facilitates making cross-channel predictions from a user-provided scenario (e.g., scenario $130_1$). A user 105 can further use the simulated model 128 to generate other reports (e.g., reports $132_1$, reports $132_2$, reports $132_3$, etc.) based on a particular user-provided scenario. Strictly as one example, a report can come in the form of an ROI report that quantifies the return on investment of the particular mix of spends after considering cross-channel effects.

The mix of spends in portfolio 103 can encompass a wide range of channels over a wide range of media. Some such media and respective channels are further discussed in FIG. 2.

In some investment situations, the return on a given investment can be directly observed (e.g., the change in share price for a firm in which shares were purchased). However the return (e.g., somebody buys a widget) on many types of marketing investments (e.g., a TV spot for widgets) are not easily observed directly—rather the ROI or other performance of the investment can be observed only in aggregate (e.g., more purchases for widgets were made after the TV spots ran). The situation arising from the difficulty or inability to arrive at direct cause-and-effect correlations between a particular marketing stimulus and a particular response is exacerbated when, for instance, multiple investments are made in multiple marketing channels comprising a marketing campaign (e.g., comprising TV ads, print ad placements, placement of display ads, and so on). The effects (e.g., responses) of such stimulus in a marketing campaign are sometimes only observable indirectly (e.g., via conversions from display ads, sales through stores, number of call center calls, online searches and/or visits, etc.). Further, analysis and data presentation is needed in order to determine what share of each response should be attributed to each channel, and various techniques are presented herein to quantify cross-channel contributions. In particular, a learning model can be developed from collected data, which learning model can be used to generate predictions of responses based on an arbitrary or hypothetical stimulation. As is discussed herein, such a learning model, and a predictive model that captures cross-channel correlations, can facilitate determining what share of each response should be attributed to a particular stimulation.

From these attributions, a particular measured response can be broken out into responses or portions thereof that are attributable to a particular stimulation. For example, if TV ads are run during a particular month (e.g., January), and also radio spots are run that same month, then using the techniques discussed herein, the increase in sales for that month can be broken out into contributions deriving from the TV ads, and contributions deriving from the radio spots. The aforementioned learning model and predictive model can be developed from the combination of the TV ad stimulations, the radio spot stimulations, and the sales figures for that month.

In a future timeframe (e.g., February) the learning model and predictive model developed from last month (e.g., January) can be used together with the future timeframe's stimulation and response data to determine ROI. Moreover, when using the techniques discussed herein, the channel-level attributions, ROI, and other metrics can be determined in real-time, thus facilitating interactive updates to the predictive model.

Figure 1B:
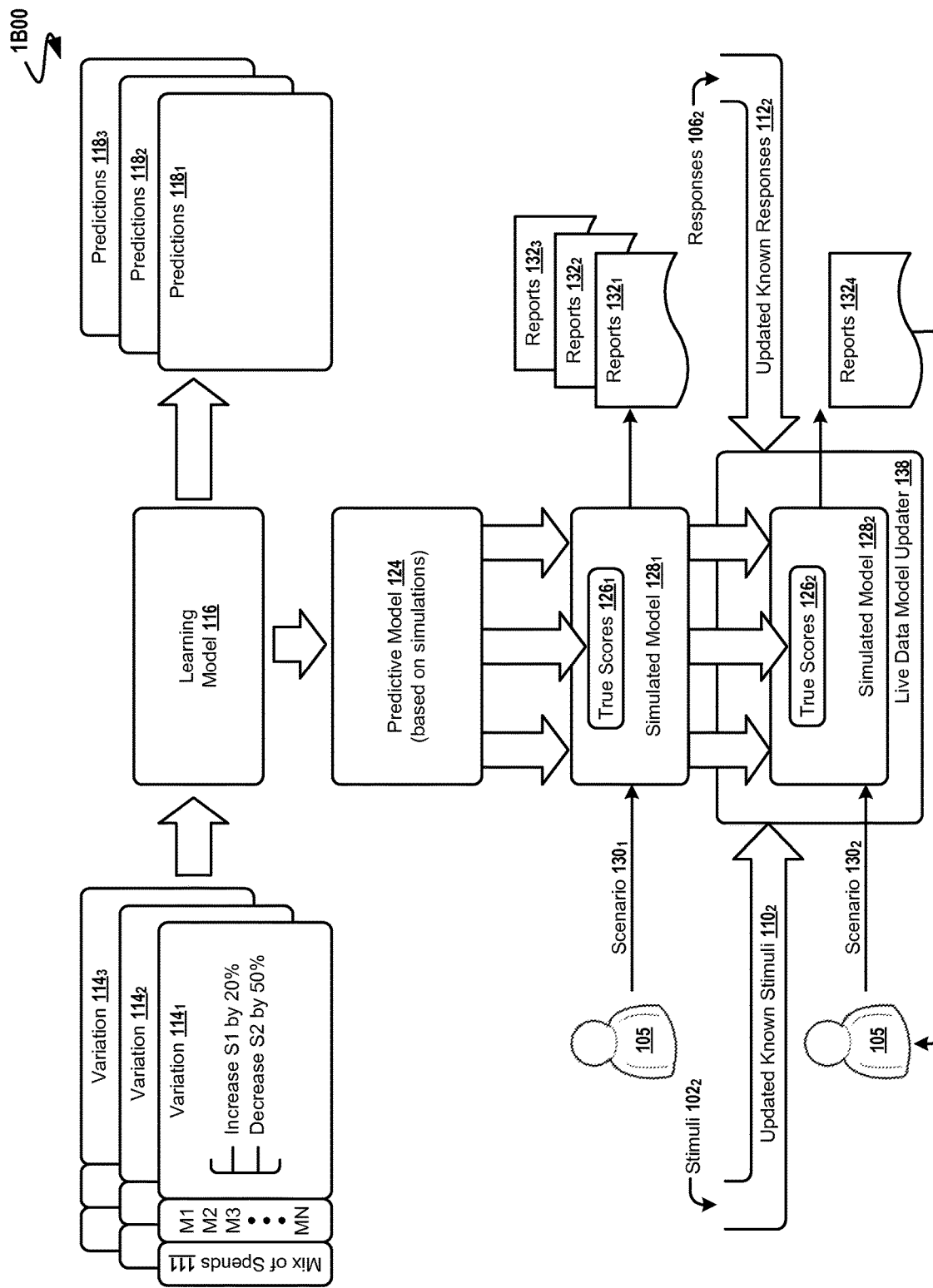
FIG. 1B depicts an environment for performing interactive updates to a precalculated cross-channel predictive model, according to some embodiments.

Some of the techniques used to apply interactive updates to the predictive model are briefly discussed in FIG. 1B. Additional such techniques are further discussed infra (e.g., see FIG. 12).

FIG. 1B depicts an environment 100 for performing interactive updates to a precalculated cross-channel predictive model. As an option, one or more instances of environment 100 or any aspect thereof may be implemented in the context of the architecture and functionality of the embodiments described herein.

FIG. 1B depicts some of the techniques used for performing interactive updates to a precalculated cross-channel predictive model. As shown, the learning model 116, predictive model 124, and simulated model $128_1$ as have been earlier generated (e.g., see the embodiment of FIG. 1A) are used to facilitate calculations using "live updates". More particularly, the simulated model $128_1$ as developed and used in the embodiment of FIG. 1B is updated (e.g., using live data model updater 138) to generate simulated model $128_2$ to reflect the cross-channel correlations between measured stimuli and measured responses using updated known stimuli $110_2$ (e.g., from stimuli $102_2$) and updated known responses $112_2$ (e.g., from responses $106_2$). Continuing with the month by month example (e.g., the foregoing February updates over January models), the true scores $126_1$ from the previous month are updated to produce updated true scores $126_2$, which updated true scores $126_1$ are derived at least in part from the updated known stimuli and updated known responses.

A user 105 can input or otherwise provide such updated known stimuli, and updated known responses using a graphical user interface to a computer, and the results (e.g., reports $132_4$) can be provided to the user. In some use models, a user 105 inputs scenario $130_2$, and the updated true scores are used in the generation of plots, charts, and reports (e.g., ROI reports) that are based on the updated known stimuli and updated known responses as applied to the precalculated cross-channel predictive model.

As is further discussed herein, the generation of the aforementioned precalculated cross-channel predictive model can be based on a large corpus of data, possibly many hundreds of megabytes of data, and the computing of the cross-channel correlations and cross-channel weights in the predictive model can require a significant amount of computing time, thus the capability to facilitate "live updates" based on interactively applied new, updated stimulus and response is desired. Various techniques to facilitate live updates, techniques used in an interactive setting (e.g., using a graphical user interface), and techniques to use same to optimize media spending are discussed infra. Such techniques can involve any number and/or constitution of marketing channels. An exemplary selection of such marketing channels is presented and discussed as pertaining to FIG. 2.

Figure 2:
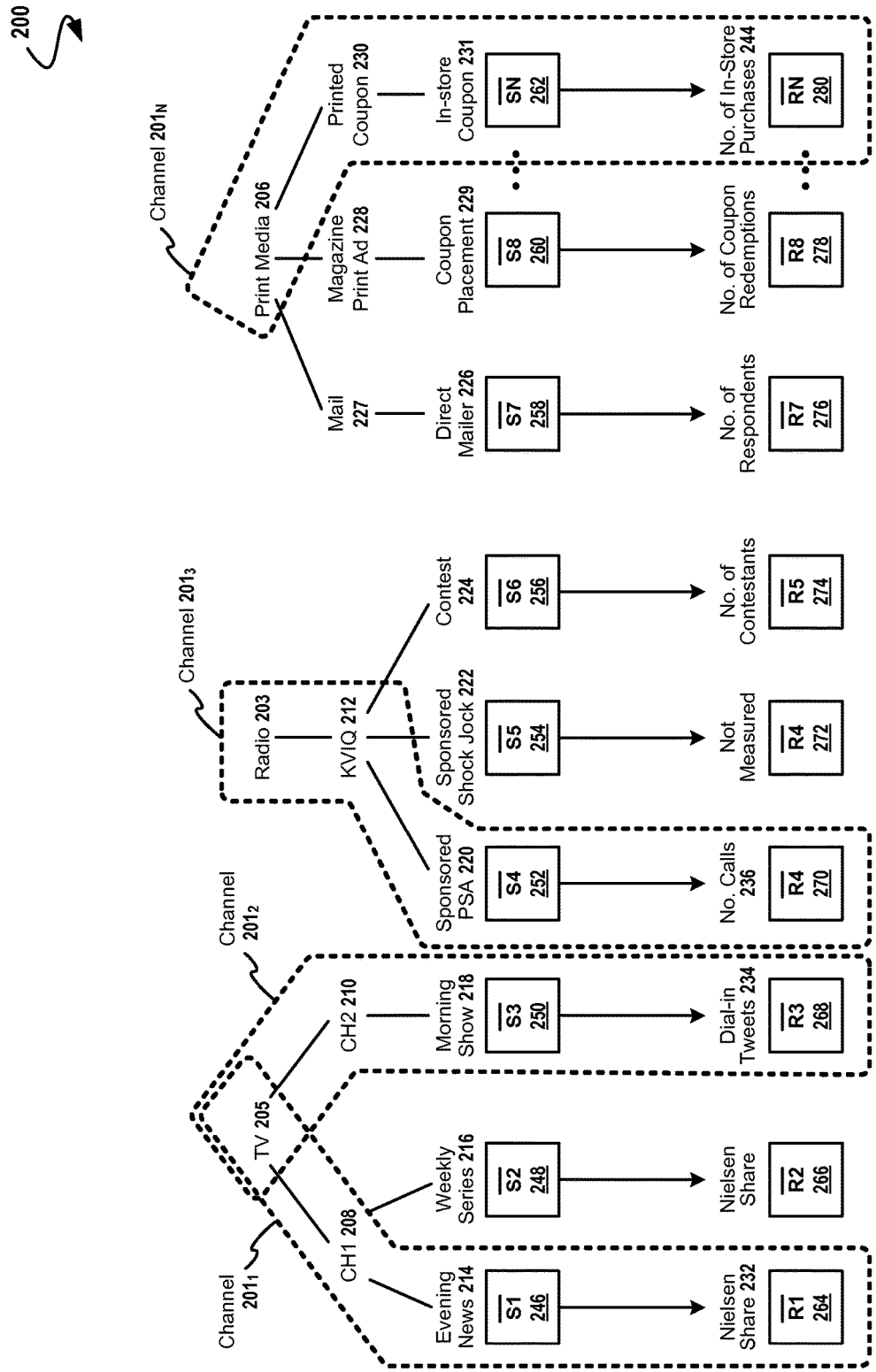
FIG. 2 presents a portfolio schematic showing multiple channels as used in systems for media spend optimization using a cross-channel predictive model, according to some embodiments.

FIG. 2 presents a portfolio schematic 200 showing multiple channels as used in systems for media spend optimization using a cross-channel predictive model. As an option, one or more instances of portfolio schematic 200 or any aspect thereof may be implemented in the context of the architecture and functionality of the embodiments described herein. Also, the portfolio schematic 200 or any aspect thereof may be implemented in any desired environment.

As shown, the portfolio schematic 200 includes three types of media, namely TV 205, radio 203, and print media 206. Under each media type are shown one or more spends. TV comprises stations named CH1 208 and CH2 210. Radio comprises a station named KVIQ 212. Print media comprises distributions in the form of mail 227, a magazine print ad 228 and/or a printed coupon 230. For each media shown, there are one or more stimulations (e.g., S1, S2, . . . SN) and their respective response (e.g., R1, R2, R3 . . . RN). As shown, there is a one-to-one correspondence between a particular stimulus and its response. For example, the TV spot "Evening News" 214 is depicted with stimulus S1, and has a Nielsen share 232 corresponding response of R1. The stimuli and responses discussed herein are often formed as a time-series of individual stimulations and responses, respectively. For notational convenience a time-series is given as a vector, such as the shown vector S1.

Continuing the discussion of this portfolio schematic 200, the portfolio includes spends for TV in the form of evening news 214, a weekly series 216, and a morning show 218. The portfolio also includes radio spends in the form of a sponsored public service announcement 220, a sponsored shock jock spot 222, and a contest 224. The portfolio includes spends for radio station KVIQ 212, a direct mailer 226, and magazine print ads 228 (e.g., coupon placement 229). The portfolio also includes spends for print media 206 in the form of coupons such as printed coupon 230 and in-store coupon 231, as shown.

The portfolio schematic includes a graphic depiction of stimulus events shown as stimulus vectors (e.g., S1 246, S2 248, S3 250, S4 252, S5 254, S6 256, S7 258, S8 260, and SN 262). The portfolio schematic 200 also shows a set of response measurements to be taken, shown as response vectors (e.g., R1 264, R2 266, R3 268, R4 270, R5 272, R6 274, R7 276, R8 278, and RN 280). As shown, channel $201_1$ includes a measurement using Nielsen share 232, channel $201_2$ includes a measurement using dial-in tweets 234, channel $201_3$ includes a measurement using number of calls 236, and channel $201_N$ includes a measurement using the number of in-store purchases 244.

Figure 3:
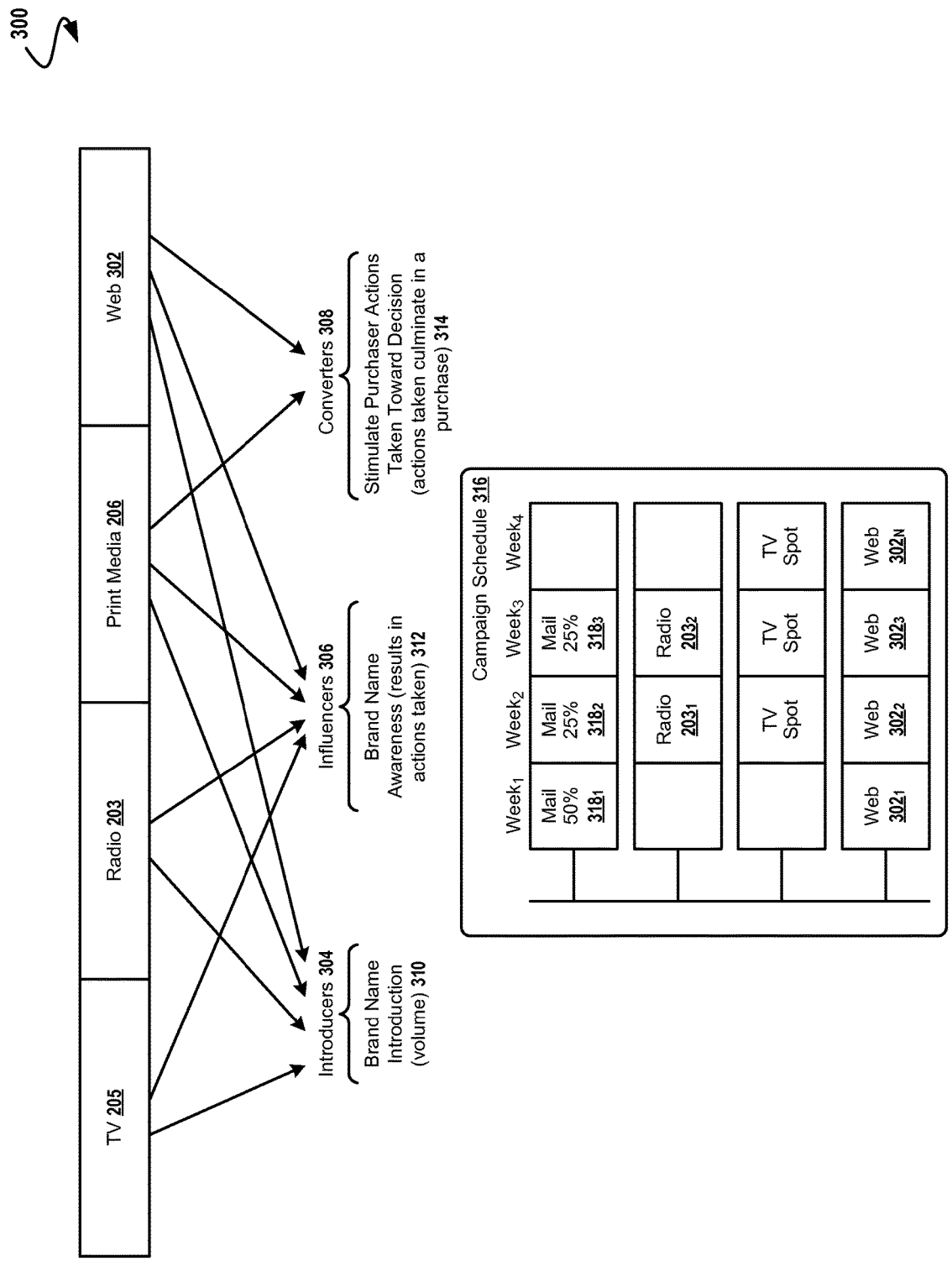
FIG. 3 depicts a multi-channel campaign execution plan to be prosecuted using media spend optimization using a cross-channel predictive model, according to some embodiments.

FIG. 3 depicts a multi-channel campaign execution plan to be prosecuted using media spend optimization using a cross-channel predictive model. As an option, one or more instances of campaign execution plan 300 or any aspect thereof may be implemented in the context of the architecture and functionality of the embodiments described herein. Also, the campaign execution plan 300 or any aspect thereof may be implemented in any desired environment.

An advertising campaign might coordinate placements across many channels using many types of media. Coordination of media might include TV 205, radio 203, print media 206, web 302, and others. Any one of the available media types might be used as introducers 304, and/or as influencers 306, and/or as converters 308. Often certain marketing objectives (e.g., brand name introduction 310, brand name awareness 312, stimulate purchaser actions taken toward decision 314, etc.) can be met most efficiently using one or another particular type of media or combinations of media. For example, TV is often used as an introducer (e.g., to create brand reach), print media is often used as an influencer (e.g., to transform brand awareness into some particular actions taken), and the web is often used as a converter (e.g., when the actions taken culminate in a purchase).

In many cases, there is a delay between a particular spend and expectation of a respective response. For example, if a direct mail flyer is mailed on a Saturday evening, it would be expected that responses cannot occur any time before the following Monday. In other cases, an expected response can be obtained even after the marketing spend has been terminated. Such a delayed response can occur for many reasons (e.g., due to factors such as brand equity etc.).

Such factors can be considered when developing models. In certain situations, the delays are present in a given pair of stimulus-response time-series (see FIG. 4A) and in some cases, delays can be automatically determined during correlation steps (see FIG. 4B).

As shown, the campaign schedule 316 staggers marketing actions over time in expectation of matching the spends to expected delays in response from earlier spends. For example, a mass mailing is undertaken at the earliest moment in the campaign (see Week$_1$) with the expectation of a mail system delay of a week or less. Then, one week later (see Week$_2$) TV and radio spots are run. During the prosecution of the campaign, a time-series of spends occurs, and a time-series of responses is observed. Such spends and observations can be codified (e.g., into a spreadsheet or a list or an array, etc.) and used as known stimuli 110 (e.g., in a time-series of stimulus scalars) and known responses 112 (e.g., in a time-series of response scalars).

Figure 4A:
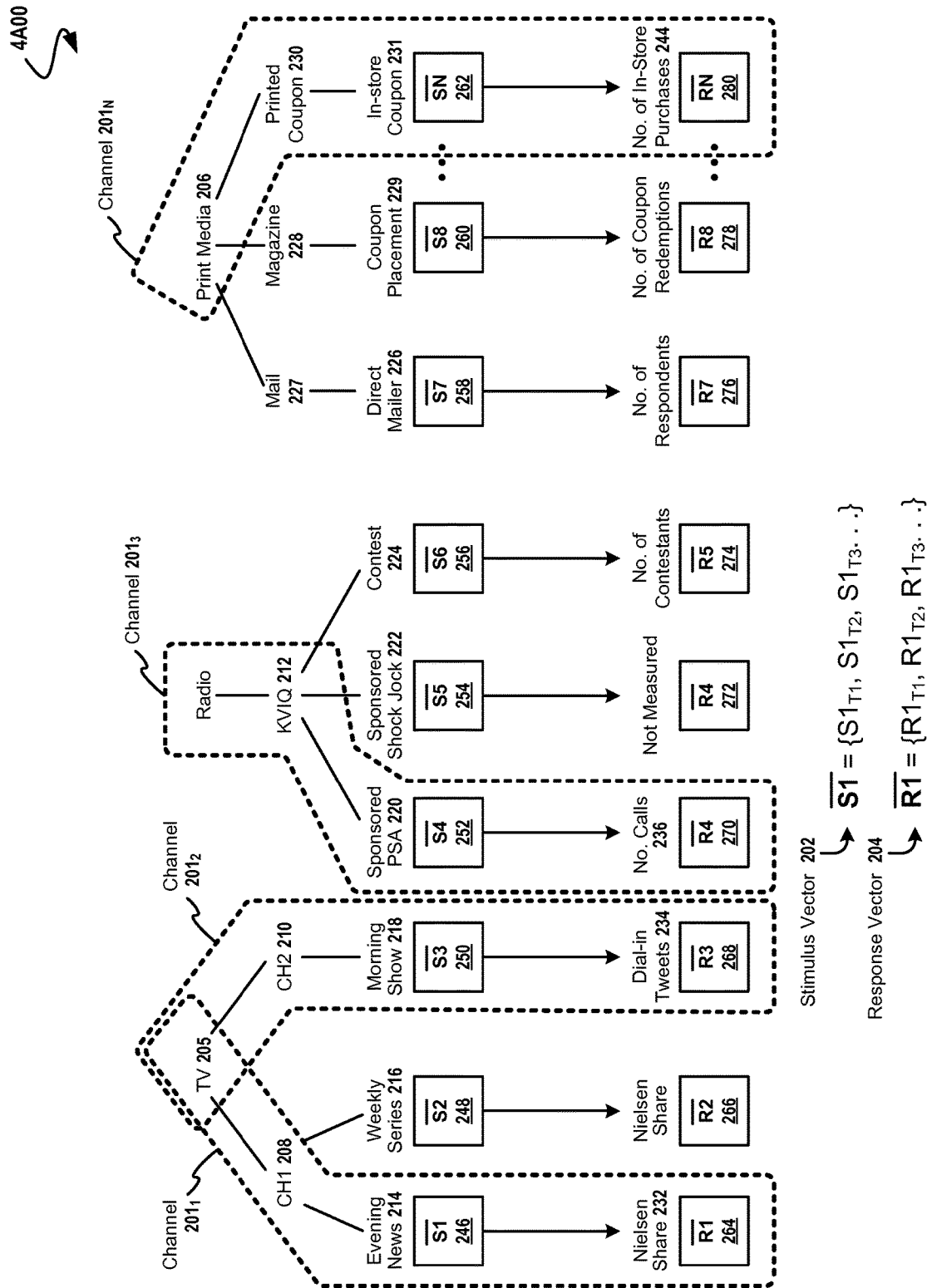
FIG. 4A is a chart depicting vectors formed from a time-series of scalars as used in forming a cross-channel predictive model, according to some embodiments.

FIG. 4A is a chart 4A00 depicting vectors formed from a time-series of scalars as used in to form a cross-channel predictive model. As an option, one or more instances of vectors or any aspect thereof may be implemented in the context of the architecture and functionality of the embodiments described herein.

The shown vector $\overline{S1}$ is comprised of a time-series. The time-series can be presented in a native time unit (e.g., weekly, daily) and can be apportioned over a different time unit. For example, stimulus S1 corresponds to a weekly spend for "Prime Time News" even though the stimulus to be considered actually occurs nightly (e.g., during "Prime Time News"). The weekly spend stimulus can be apportioned to a nightly stimulus occurrence. In some situations, the time unit in a time-series can be very granular (e.g., by the minute). Apportioning can be performed using any known techniques. Stimulus vectors (e.g., stimulus vector 202) and response vectors (e.g., response vector 204) can be formed from any time-series in any time units and can be apportioned to another time-series using any other time units.

Figure 4B:
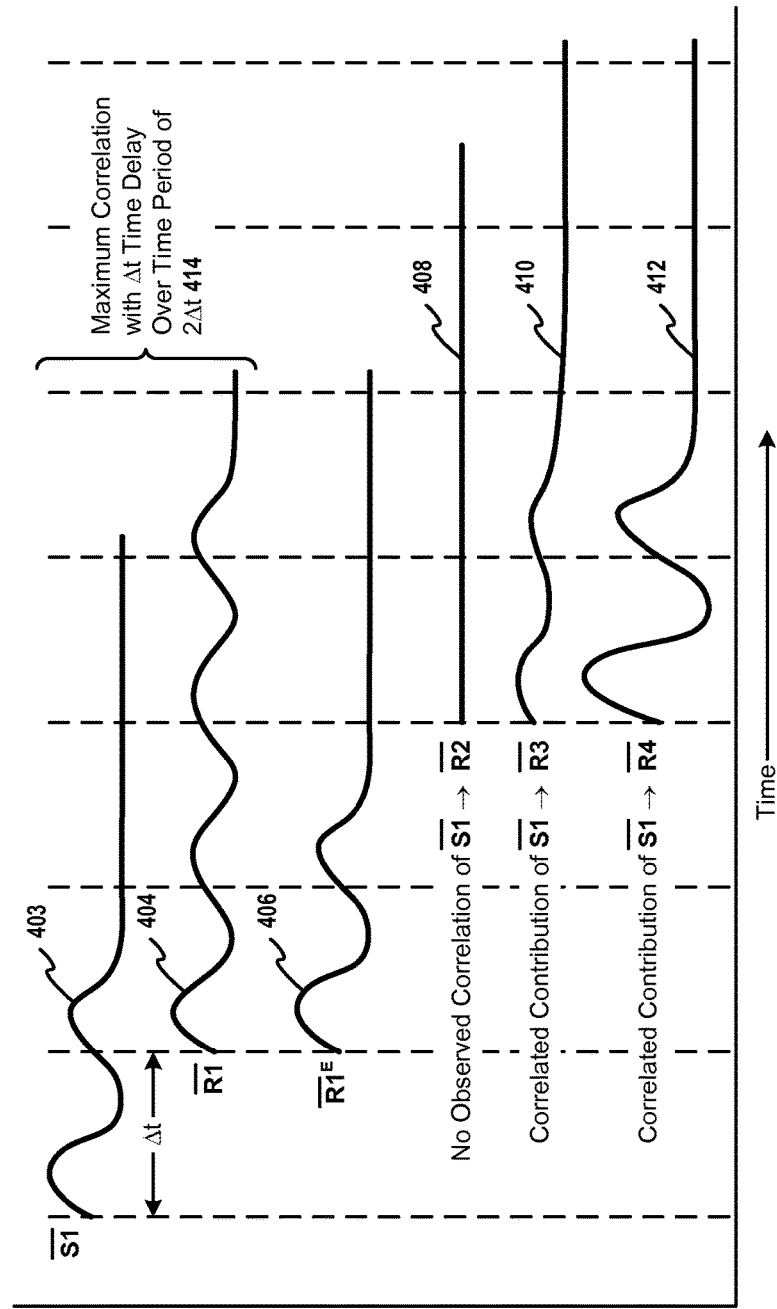
FIG. 4B is a correlation chart showing time- and value-based correlations as used to form a cross-channel predictive model, according to some embodiments.

FIG. 4B is a correlation chart 4B00 showing time- and value-based correlations as used to form a cross-channel predictive model. As an option, one or more instances of correlation chart 4B00 or any aspect thereof may be implemented in the context of the architecture and functionality of the embodiments described herein. Also, the correlation chart 4B00 or any aspect thereof may be implemented in any desired environment.

A particular stimulus in a first marketing channel (e.g., $\overline{S1}$) might produce corresponding results (e.g., $\overline{R1}$). Additionally, a stimulus in a first marketing channel (e.g., $\overline{S1}$) might produce results (or lack of results) as given by measured results in a different marketing channel (e.g., $\overline{R3}$). Such correlation of results or lack of results can be automatically detected, and a scalar value representing the extent of correlation can be determined mathematically from any pair of vectors. In the discussions just below, the correlation of a time-series response vector is considered with respect to a time-series stimulus vector. Correlations can be positive (e.g., the time-series data moves in the same directions), or negative (e.g., the time-series data moves in the opposite directions), or zero (no correlation). Those skilled in the art will recognize there are many known-in-the-art techniques to correlate any pair of curves.

As shown, the vector $\overline{S1}$ is comprised of a series of changing values (e.g., depicted by the regression-fitted series covering the curve 403). The response $\overline{R1}$ is shown as curve 404. As can be appreciated, even though the curve 404 is not identical to the curve 403 (e.g., it has undulations in the tail) the curve 404 is substantially value-correlated to curve 403. Maximum value correlation 414 occurs when curve 404 is time-shifted by Δt amount of time relative to curve 403 (see time Δt graduations). The amount of correlation (see discussion infra) and amount of time shift can be automatically determined. Cross-channel correlation examples are presented in Table 1.

TABLE 1

Cross-correlation examples

| Stimulus Channel → Cross-channel | Description |
|---|---|
| S1 → R2 | No correlation. |
| S1 → R3 | Correlates if time shifted and attenuated. |
| S1 → R4 | Correlates if time shifted and amplified. |

In some cases, a correlation calculation can identify a negative correlation where an increase in a first channel causes a decrease in a second channel. Further, in some cases, a correlation calculation can identify an inverse correlation where a large increase in a first channel causes a small increase in a second channel. In still further cases, there can be no observed correlation (e.g., see curve 408), or in some cases correlation is increased when exogenous variables are considered (e.g., see curve $R1^E$ 406).

In some cases a correlation calculation can hypothesize one or more causation effects. And in some cases correlation conditions are considered when calculating correlation such that a priori known conditions can be included (or excluded) from the correlation calculations.

Also, as can be appreciated, there is no correlation to the shown time-series R2. The curve 410 is substantially value-correlated (e.g., though scaled down) to curve 403, and is time-shifted by a second Δt amount of time relative to curve 403. The curve 412 is substantially value-correlated (e.g., though scaled up) to curve 403, and is time-shifted by a second Δt amount of time relative to curve 403.

The automatic detection can proceed autonomously. In some cases correlation parameters are provided to handle specific correlation cases. In one case, the correlation between two time-series can be determined to a scalar value using Eq. 1:

$$r = \frac{n\sum xy - (\sum x)(\sum y)}{\sqrt{n(\sum x^2) - (\sum x)^2} \sqrt{n(\sum y^2) - (\sum y)^2}} \quad (1)$$

where:
x represents components of a first time-series,
y represents components of a second time-series, and
n is the number of {x, y} pairs.

In some cases, while modeling a time-series, not all the scalar values in the time-series are weighted equally. For example, more recent time-series data values found in the historical data are given a higher weight as compared to older ones. Various shapes of weights to overlay a time-series are possible, and one exemplary shape is the shape of an exponentially decaying model.

Such correlation techniques can be used by a stimulus-response correlator in the context of developing predictive models. Techniques for training predictive models are introduced in FIG. 5A. Techniques for validating predictive models are introduced in FIG. 5B.

Figures 5A, 5B:
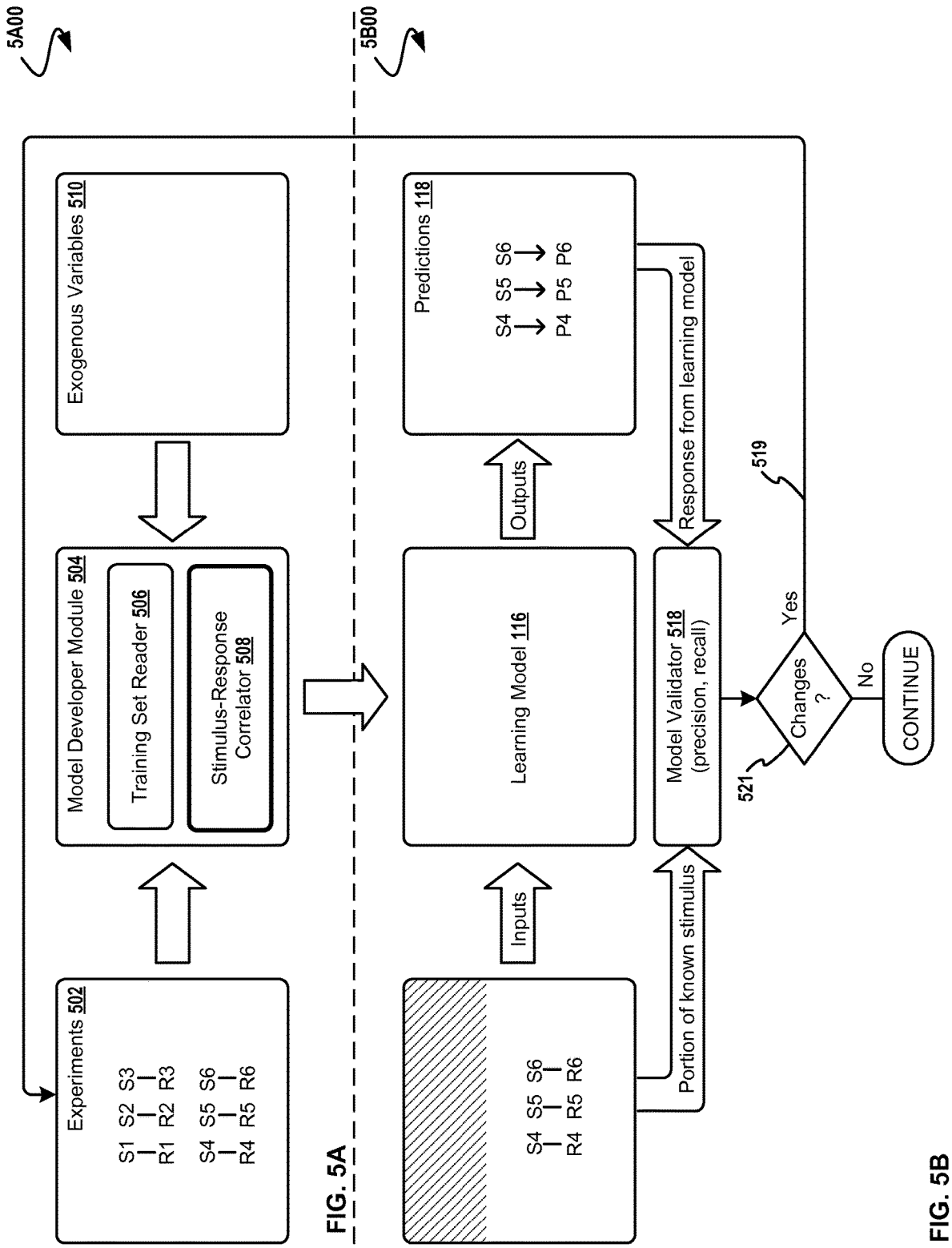
FIG. 5A depicts an unsupervised model training flow resulting in a baseline trained model, according to some embodiments.
FIG. 5B depicts a supervised model validation flow resulting in a learning model, according to some embodiments.

FIG. 5A depicts an unsupervised model training flow 5A00 resulting in a baseline trained model. As an option, one or more instances of unsupervised model training flow 5A00 or any aspect thereof may be implemented in the context of the architecture and functionality of the embodiments described herein. Also, the unsupervised model training flow 5A00 or any aspect thereof may be implemented in any desired environment.

As shown, a model developer module 504 includes a training set reader 506 and a stimulus-response correlator 508. The model developer module 504 takes as inputs a set of experiments 502 (e.g., pairs of stimulus and corresponding response measurements) and a set of exogenous variables 510. As earlier discussed, the exogenous variables serve to eliminate or attenuate effects that are deemed to be independent from the stimulus.

FIG. 5B depicts a supervised model validation flow 5B00 resulting in a learning model. As an option, one or more instances of supervised model validation flow 5B00 or any aspect thereof may be implemented in the context of the architecture and functionality of the embodiments described herein. Also, the supervised model validation flow 5B00 or any aspect thereof may be implemented in any desired environment.

The operations as shown and discussed as pertaining to FIG. 5A produce a learning model 116. This learning model can be validated so as to achieve a confidence score and/or precision and recall values. In one case, a portion of the experiments 502 are provided as inputs to the learning model, and predictions 118 are captured. A model validator 518 compares the response predictions of the learning model to the actual response vectors as were captured empirically, and if a sufficient confidence and/or precision and/or recall is determined, then the model is deemed validated. In some cases changes might be indicated, and path 519 is taken for remedial steps. Remedial steps might include compiling additional experiments, and/or performing model validation with different parameters, and/or including or excluding exogenous variables, etc.

As described above, validations are performed on the model using historical data itself (e.g., where both the stimulus and response are measured data) to ensure goodness of fit and prediction accuracy. In addition to model validation using the training dataset, additional validation steps are performed to check prediction accuracy and to ensure that the model is not just doing a data fitting.

Model validation can occur at any moment in time, and indeed, model validation can occur using the supervised model validation flow 5B00. For example, the model developer module 504 can update the learning model 116. In such a case, a training model can be trained using training data up to the latest available date, which training model in turn can be used to predict the values in the historical data (e.g., data captured in the past). The error in the training model can be calculated using statistical metrics.

As shown, (e.g., see path 519) model development and optimization is an iterative process (e.g., see decision 521 and path 519) involving updating the model with changes, and/or adjustments, and/or new or different exogenous variables (see discussion below), and/or newly captured stimulus/response data, etc. to make sure the model behaves within tolerances with respect to predictive statistical metrics, such as using significance tests.

Exogenous Variables

Use of exogenous variables might involve considering seasonality factors or other factors that are hypothesized to impact, or known to impact, the measured responses. For example, suppose the notion of seasonality is defined using quarterly time graduations. And the measured data shows only one quarter (e.g., the $4^{th}$ quarter) from among a sequence of four quarters in which a significant deviation of a certain response is present in the measured data. In such a case, the exogenous variables 510 can define a variable that lumps the $1^{st}$ through $3^{rd}$ quarters into one variable and the $4^{th}$ quarter into a separate variable. The model developer module 504, and/or its input functions, may determine that for a certain response, there is no period that behaves significantly differently from other periods, in which case the seasonality is removed or attenuated for that response.

Figure 6A:
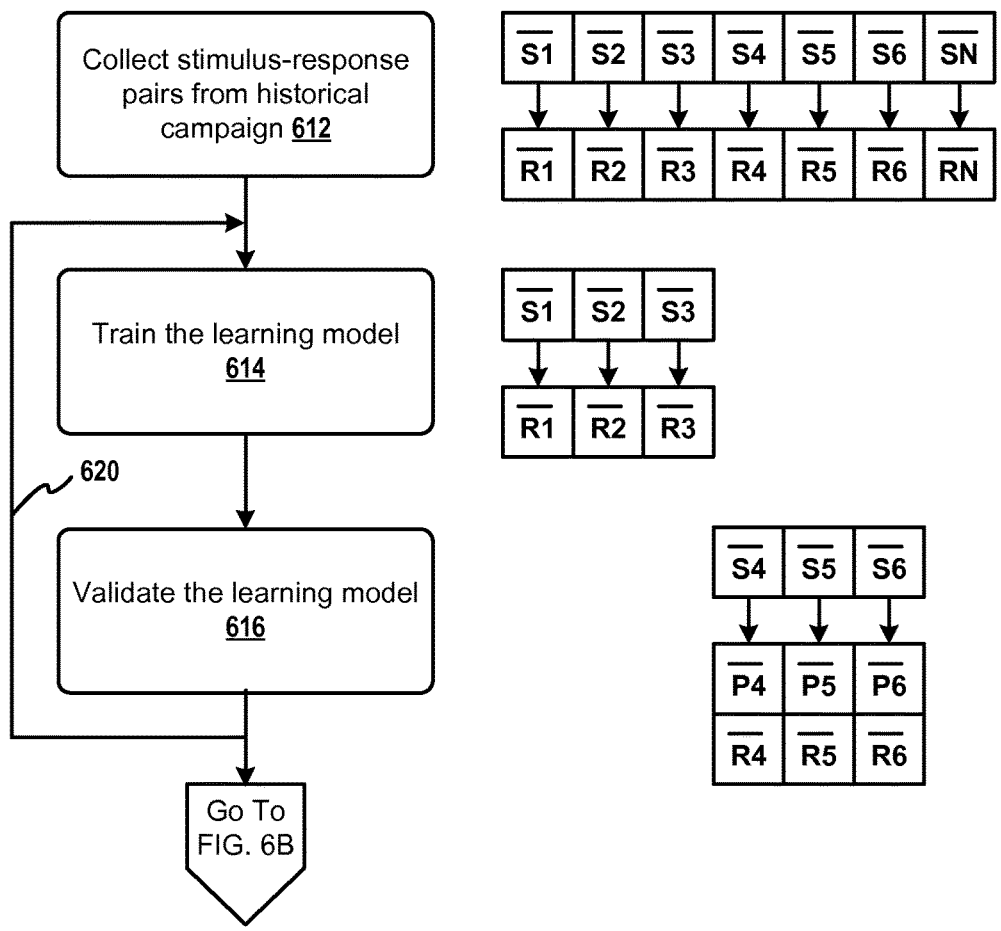
FIG. 6A and FIG. 6B depict a model development flow and a simulation model development flow used to develop simulation models for use in systems for media spend optimization using a cross-channel predictive model, according to some embodiments.
Figure 6B:
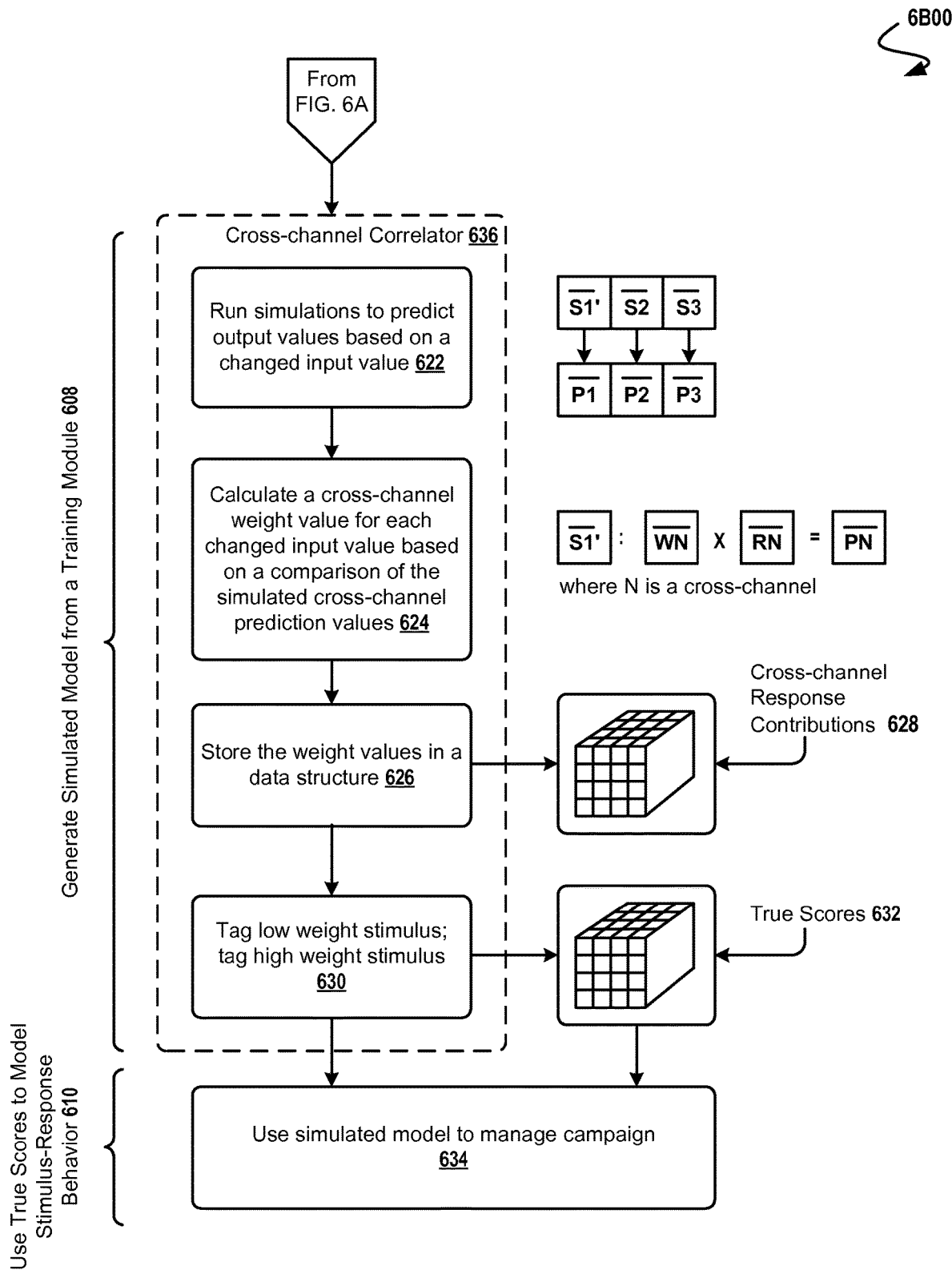

FIG. 6A and FIG. 6B depict a model development flow 6A00 and a simulation model development flow 6B00 used to develop simulation models for use in systems for media spend optimization using a cross-channel predictive model. As an option, one or more instances of the flows or any aspect thereof may be implemented in the context of the architecture and functionality of the embodiments described herein.

As shown, stimulus vectors S1 through SN are collected, and response vectors R1 through RN are collected and organized in one-to-one pairings (see operation 612). A portion of the collected pairs (e.g., pairs S1R1 through S3R3) can be used to train a learning model (see operation 614). A different portion of the collected pairs (e.g., pairs S4R5 through S6R6) can be used to validate the learning model (see operation 616). The processes of training and validating can be iterated (see path 620), perhaps using any of the model development techniques shown and described pertaining to FIG. 5A and FIG. 5B. The processing continues to operations depicted in FIG. 6B.

FIG. 6B depicts process steps used in the generation of a simulation model from a training model (see grouping 608). A cross-channel correlator 636 is used to carry out some or all of the following steps:

- Run simulations of varying stimulus using the learning model to predict output value changes (e.g., responses) from the varied stimulation (see operation 622).
- Using the simulations of operation 622, observe the changes in the responses in other channels (see operation 624). For example, and as shown, if only stimulus S1 is applied and varied across some range, the predicted response given as P2 is captured. A response in channel #2 (i.e., P2) to a stimulus variation over a channel #1 stimulus (i.e., S1') is deemed to be a cross-channel effect. In some cases, the effect in a cross channel can be modeled as a linear response, and a cross-channel weight (e.g., W2) can be calculated and stored as a value. A weight value corresponding to the effect in channel #M from a stimulus in channel #N can be noted as $W_{SNRM}$.
- Weight values covering all combinations of stimulus-response pairs can be stored in a data structure (see operation 626). As shown, such a data structure can be organized to cross-channel response contributions 628 for each cross-channel simulation (e.g., the shown N by N two-dimensional array) plus as many additional simulated values as are performed over a sweep. For example, if a training model captured data from N channels, and a stimulus value was swept over the range [−100% through 100%] in 20% increments, the data structure would have a $3^{rd}$ dimension for holding a weight value for each of the simulated variations of {−100%, −80%, −60%, −40%, −20%, 0%, +20%, +40%, +60%, +80%, and +100%}. A portion of such a data structure is given in FIG. 7.
- Noisy values can be filtered out (see operation 630). Or, weight values that are above or below a particular threshold can be eliminated. The resulting true scores 632 are used to predict the response of the entire system based on a particular simulation model (see operation 634).

Having a simulation model that is populated with true scores facilitates using the true score simulation model to predict the response of the entire system based on a particular stimulus (e.g., a prophetic stimulus or prophetic scenario of stimuli). The true score model can be used to model stimulus-response behavior including cross-channel effects (see operations corresponding to 610). For example, if an advertiser wants to know what would be the effect on coupon redemptions if the frequency of radio spots were increased, then the advertiser would use a true score simulation model to predict the response of the entire system based on a particular stimulus of increased frequency of radio spots. Also, the advertiser can use the true score simulation model to predict the overall campaign response based on a plurality of changed stimulations. Or, an advertiser can carry out an experiment in the past. For example, if an advertiser wants to know what would have been the overall campaign effect of doubling last quarter's TV spots, the advertiser can use the true score simulation model to get an answer to what would have happened.

Figure 7:
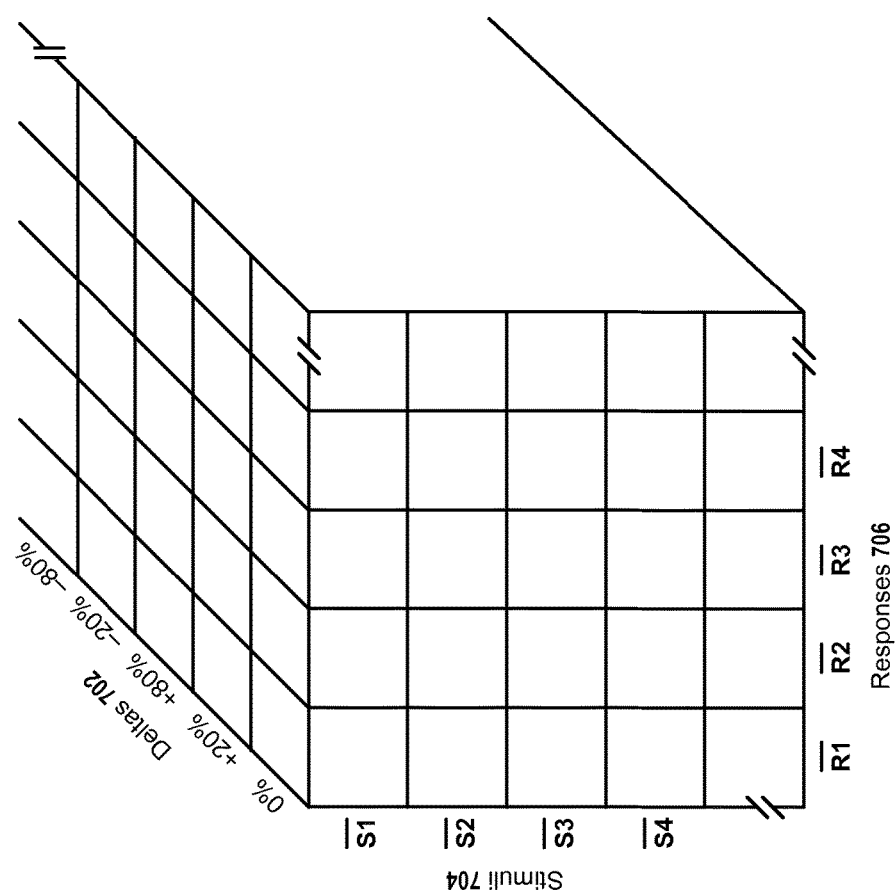
FIG. 7 depicts a true model data structure used in systems for media spend optimization using a cross-channel predictive model, according to some embodiments.

FIG. 7 depicts a true model data structure 700 used in systems for media spend optimization using a cross-channel predictive model. As an option, one or more instances of true model data structure 700 or any aspect thereof may be implemented in the context of the architecture and functionality of the embodiments described herein. Also, the true model data structure 700 or any aspect thereof may be implemented in any desired environment.

Earlier figures depict a data structure to hold true scores, the true scores comprising weights to characterize channel-by-channel responses from a particular stimulus. As shown in FIG. 7, the data structure comprises a stimulus ordinate 704, a response abscissa 706, and a dimension labeled as "deltas 702". This organization provides storage space for weight values to be stored, each weight value being used to characterize channel-by-channel responses from a particular stimulus. More specifically, and as shown, the effect of stimulus S1 on cross-channel R2 can be held in such a data structure. Still more, any number of variations of S1 and the corresponding effects on responses can be modeled. In the specific embodiment of FIG. 7, the variations shown correspond to an increase of 20%, an increase of 80%, a decrease of 20%, and a decrease of 80%.

Figure 8:
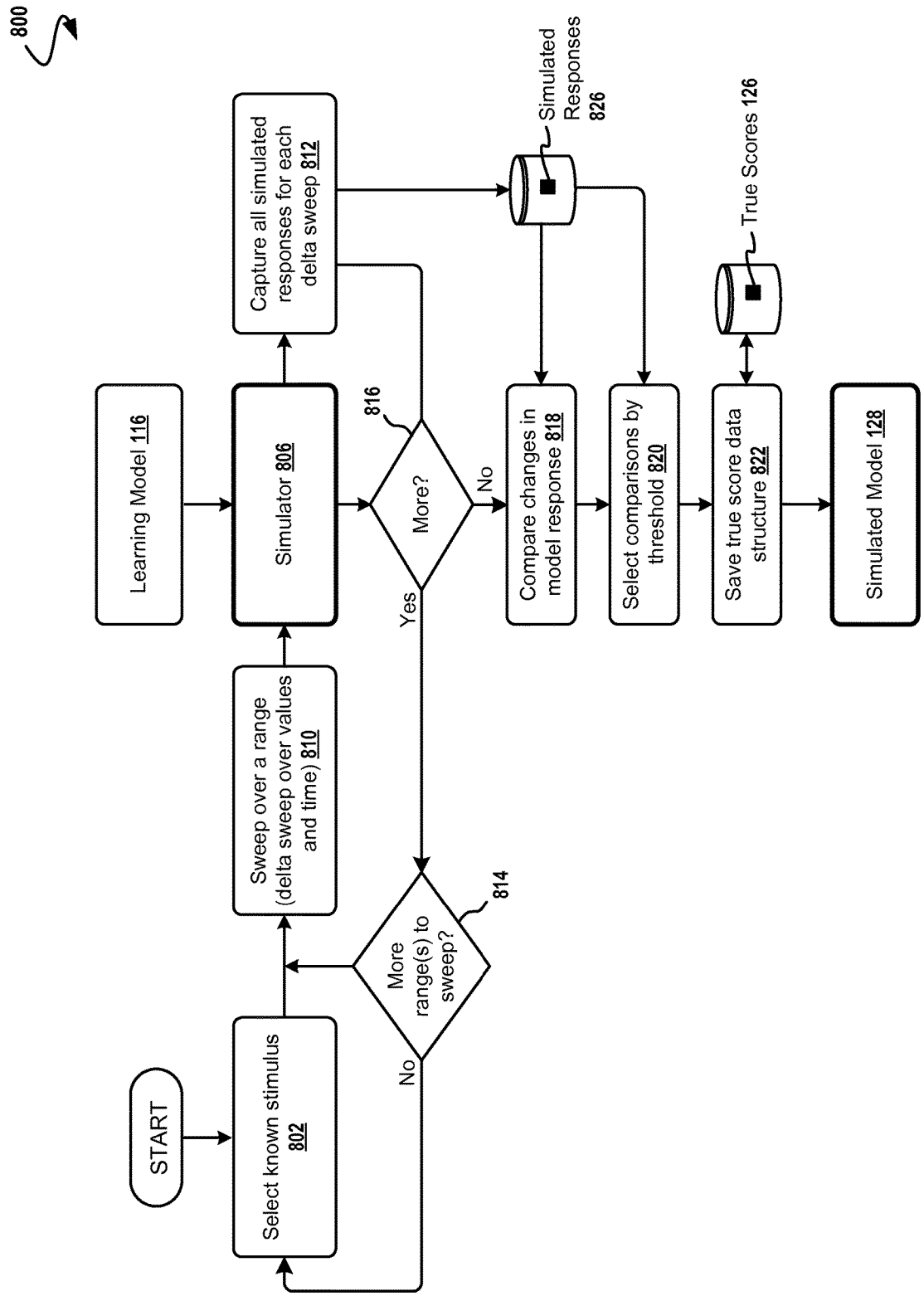
FIG. 8 is a block diagram of a subsystem for populating a true model data structure as used in systems for media spend optimization using a cross-channel predictive model, according to some embodiments.

FIG. 8 is a block diagram of a subsystem 800 for populating a true model data structure as used in systems for media spend optimization using a cross-channel predictive model. As an option, one or more instances of subsystem 800 or any aspect thereof may be implemented in the context of the architecture and functionality of the embodiments described herein. Also, the subsystem 800 or any aspect thereof may be implemented in any desired environment.

As shown, the system can commence when a particular known stimulus is selected (see operation 802). Then a step to sweep over a range is entered (see operation 810). A particular sweep value (e.g., +20%, +40%, +80%, −20%, etc.) is selected and used as an input to a simulator 806, which in turn takes in the learning model 116. The simulator, in conjunction with the learning model, produces responses (see operation 812), and each response can be captured. A series of simulations may comprise many selections of known stimuli, and a given stimulus may have a sweep range that comprises many steps, thus a decision 816 determines if there are more simulations to be performed. If so, processing continues to perform simulations over more sweep values or to perform simulations over more selected stimuli (see decision 814). When decision 816 deems that there are no more simulations to be performed, then a step is entered to observe outputs of the simulations to compare changes in model responses given the delta simulations (see operation 818). The simulated responses 826 are observed, and weight values are calculated (e.g., using a linear apportioning). The weight values are checked against one or more thresholds (see operation 820), and some weight value (e.g., weight values smaller than a threshold) can be eliminated. Remaining weight values are saved in a data structure as true scores 126 (see operation 822). The resulting data structure is used as a constituent to simulated model 128.

Figure 9:
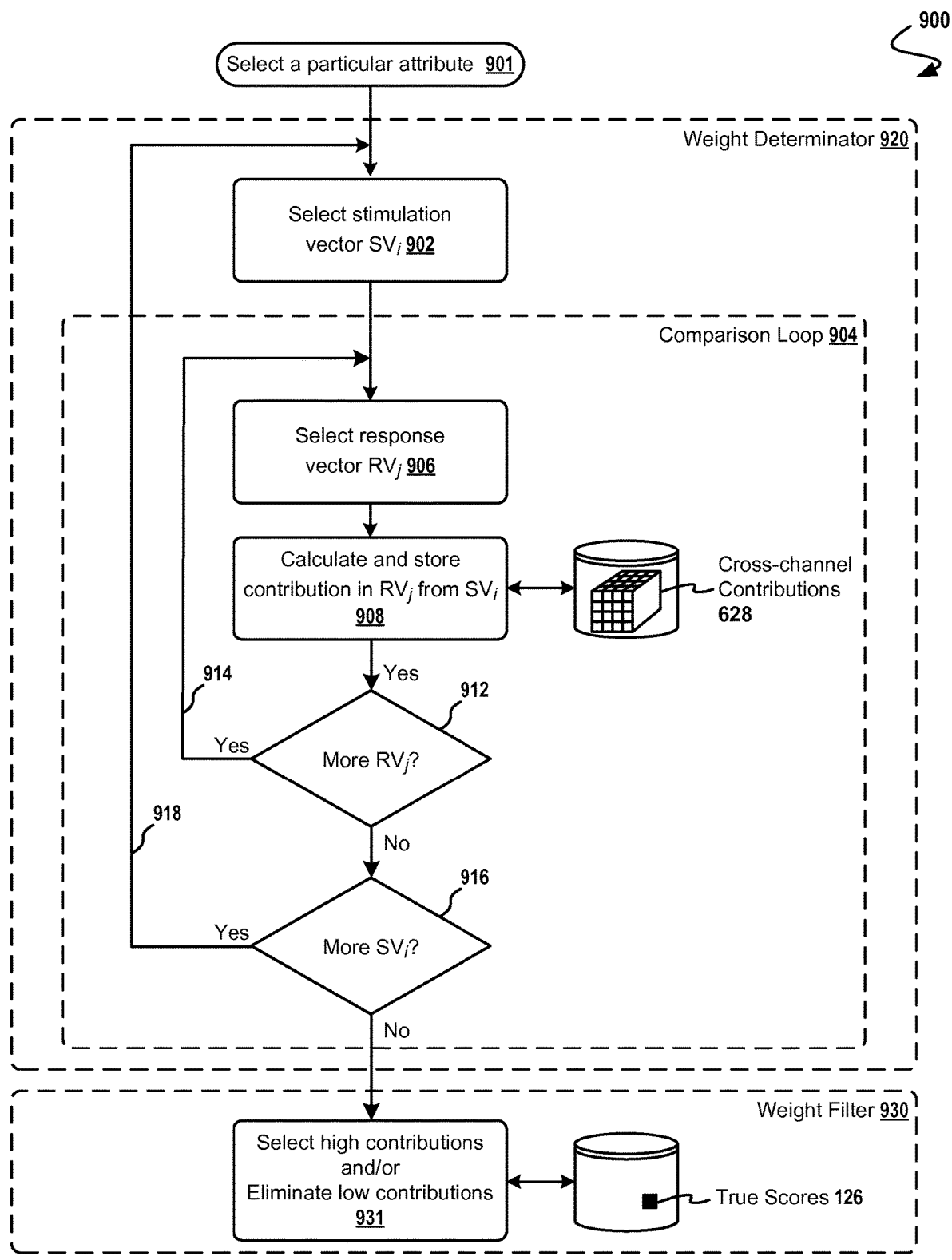
FIG. 9 is a block diagram of a subsystem for calculating cross-channel contributions as used in systems for media spend optimization using a cross-channel predictive model, according to some embodiments.

FIG. 9 is a block diagram of a subsystem 900 for calculating cross-channel contributions as used in systems for media spend optimization using a cross-channel predictive model. As an option, one or more instances of subsystem 900 or any aspect thereof may be implemented in the context of the architecture and functionality of the embodiments described herein. Also, the subsystem 900 or any aspect thereof may be implemented in any desired environment.

The above discussion of FIG. 8 describes steps to observe outputs of the simulations to compare changes in model responses given the simulated responses. The simulated responses 826 are observed, and the contribution in a response channel is calculated based on the stimulus. Specifically, and as shown in FIG. 9, the contribution in a response channel resulting from a particular stimulus can be determined by comparing the response with a delta variation to the response absent the delta variation.

FIG. 9 depicts a sample partitioning of operations to determine cross-channel effects over all stimulus and over all channels over the selected attribute. In this partitioning, the technique to determine cross-channel effects partitions certain operations into partitions, namely:

a first partition being a weight determinator 920, and
a second partition being a weight filter 930.

Operations in the partitions cooperate in a manner that results in true scores 126.

Continuing with the discussion of FIG. 9, and as shown, an attribute is first selected (see operation 901), then calculating cross-channel contributions commences upon selecting a particular attribute (e.g., spend); then selecting a stimulation vector SVi that relates to the selected attribute (see operation 902). Strictly as examples, a particular stimulation vector SVi (e.g., placement of "TV spots on Prime Time News") might be selected since it directly relates to the attribute (spend on TV spots). Or, a particular stimulation vector SVi (e.g., placements of flysheet ads") might be selected since it relates to a particular attribute (spend on newspaper spots).

The calculation of cross-channel contributions continues by entering a comparison loop 904 within which loop the following steps are taken:

Select a response vector RVj (see step 906). Response vectors RVj (where j is not equal to i) are deemed to be cross-channel response vectors. The cross-channel response vectors are used in the analysis of step 908.

Step 908 serves to calculate and store any contribution in response vector RVj resulting from stimulus vector SVi. As earlier indicated, a stimulus vector SVi might be a stimulus vector as provided to the model, or a stimulus vector SVi might be a stimulus vector that has been apportioned by a sweep operation.

The result of comparison calculations can be stored in a data structure comprising simulated responses and cross-channel response contributions 628.

If there are more cross channels to consider (see decision 912), then path 914 is taken.

If there are more stimulus vectors to consider (see decision 916), then path 918 is taken.

When the comparison loop exits (e.g., there are no more stimulus vectors to consider), then processing proceeds to filtering operations (see operation 931).

Operation 931 serves to select-in (or eliminate-out) sufficiently high (or sufficiently low) contributions to generate true scores of contributions. The true scores 126 are stored in a data structure.

Figure 10:
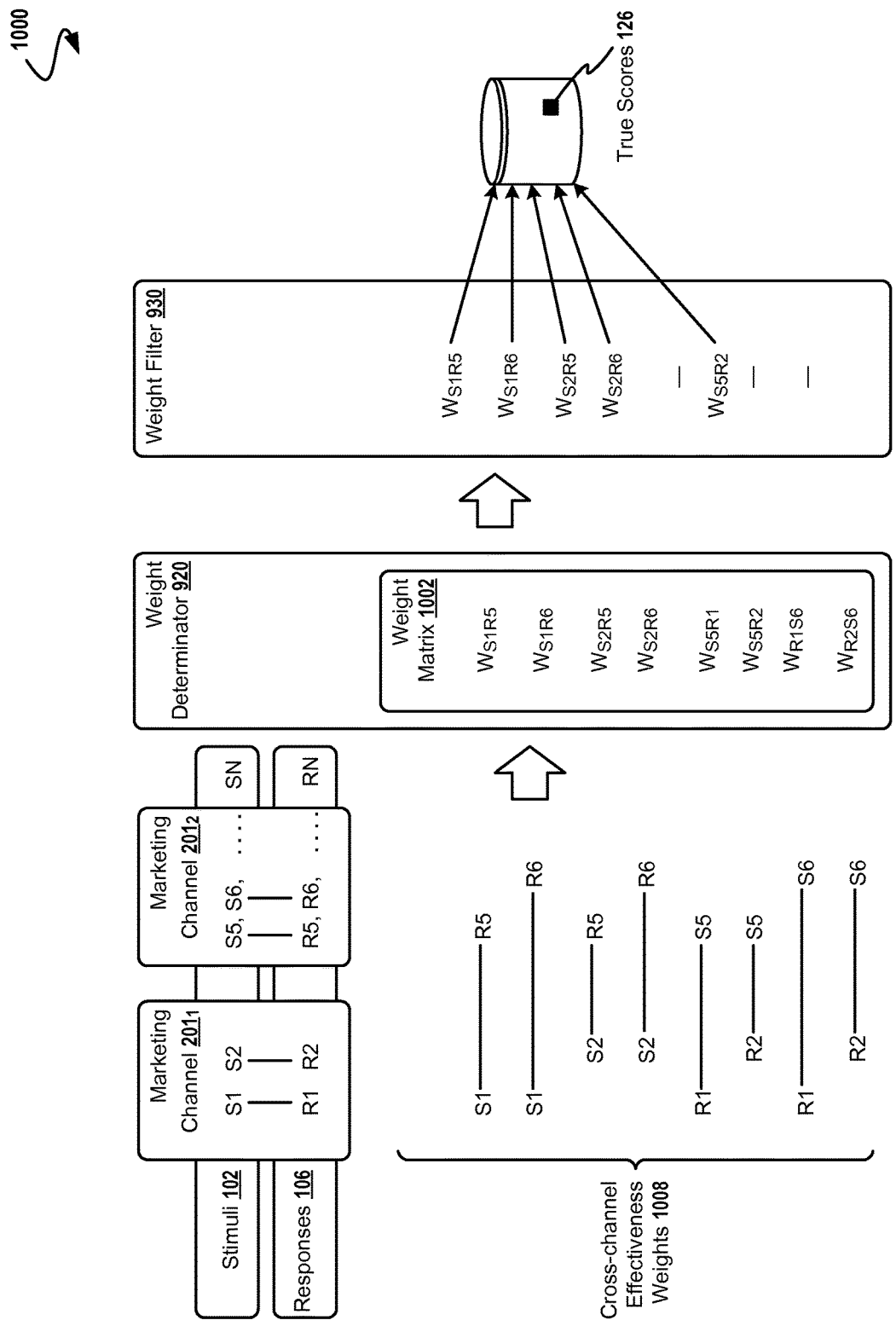
FIG. 10 is a data flow diagram for generating true scores used based on cross-channel responses, according to some embodiments.

FIG. 10 is a data flow diagram 1000 for generating true scores used based on cross-channel responses. As an option, one or more instances of diagram 1000 or any aspect thereof may be implemented in the context of the architecture and functionality of the embodiments described herein. Also, the diagram 1000 or any aspect thereof may be implemented in any desired environment.

A computer-implemented method can execute the data flow diagram 1000. The shown flow can be used in determining the effectiveness of marketing stimulations (e.g., stimulus vector 202) in a plurality of marketing channels (e.g., marketing channel $201_1$, marketing channel $201_2$, etc.). The flow proceeds upon receiving data comprising marketing stimulations (e.g., stimuli $102_1$) and responses (e.g., responses $106_1$). The marketing stimulations and respective measured responses can be received as sets of data in pairs (e.g., a one-to-one correspondence of a particular stimulus and its respective response) or as sets of data that have been aggregated (e.g., a many-to-one correspondence of a particular stimulus and a set of observed responses). The flow continues by determining, from the marketing stimulations and the respective measured responses, a set of cross-channel weights (e.g., cross-channel effectiveness weights 1008) to apply to the respective measured responses. As shown and discussed as pertaining to FIG. 6B, simulations of varying stimulus are conducted using the learning model to predict output value changes (e.g., responses) from the varied stimulations.

Using the aforementioned simulations, a weight determinator 920 observes the changes in the responses in cross-channels as a result of the varying stimulus, and generates a weight vector or weight matrix 1002. In some cases the cross-channel weights are filtered (e.g., using a weight filter 930) so as to eliminate small cross-channel weights, and/or to eliminate statistically insignificant cross-channel weights, and/or to eliminate statistically outlying cross-channel weights, etc. The remaining cross-channel weights are stored in a data structure and are used in calculating an effectiveness value of a particular one of the marketing stimulations. As an example, the effect of spending on TV spots might influence the effectiveness of a direct mail campaign.

Of course, the foregoing example does not limit the generality. The marketing stimulations can come in the form of an advertising spend, a number of direct mail pieces, a number of TV spots, a number of radio spots, a number of web impressions, a number of coupons printed etc. Further, the measured responses can come in the form of a number of calls into a call center after a broadcast, a number of clicks on an impression, a number of coupon redemptions, etc.

FIG. 11 depicts a true metrics report based on the true scores. The shown true metrics report 1100 depicts various measures of attribution across channels. In this embodiment of a true metrics report, several channels are depicted, namely "TVOther", "TVSynd", "TVBET", etc.). For each channel, a particular stimulus is depicted (e.g., dollars spent in a respective channel). The observed response in the same channel is also depicted (e.g., see the observed verification column).

Using the cross-channel true scores developed using the techniques described herein a true contribution of the responses can be apportioned to the channels (see true responses based on true scores). In some embodiments, the contribution attributed to a particular channel is apportioned as a percent.

The shown true metrics report 1100 depicts a row labeled "Organic". The organic row arises when it is determined that the entirety of the stimulus cannot be completely attributed to the corresponding stimulated channels receiving the stimulus. In this example, the portion of the aggregate response that is not attributed to the aggregate stimulus is labeled as "Organic", however other labels are possible. As shown, the row "Organic" is included to account for aggregate responses that result from effects other than the stimulated channels. In this example, the organic effect amounts to 9.8% of the total.

Figure 12:
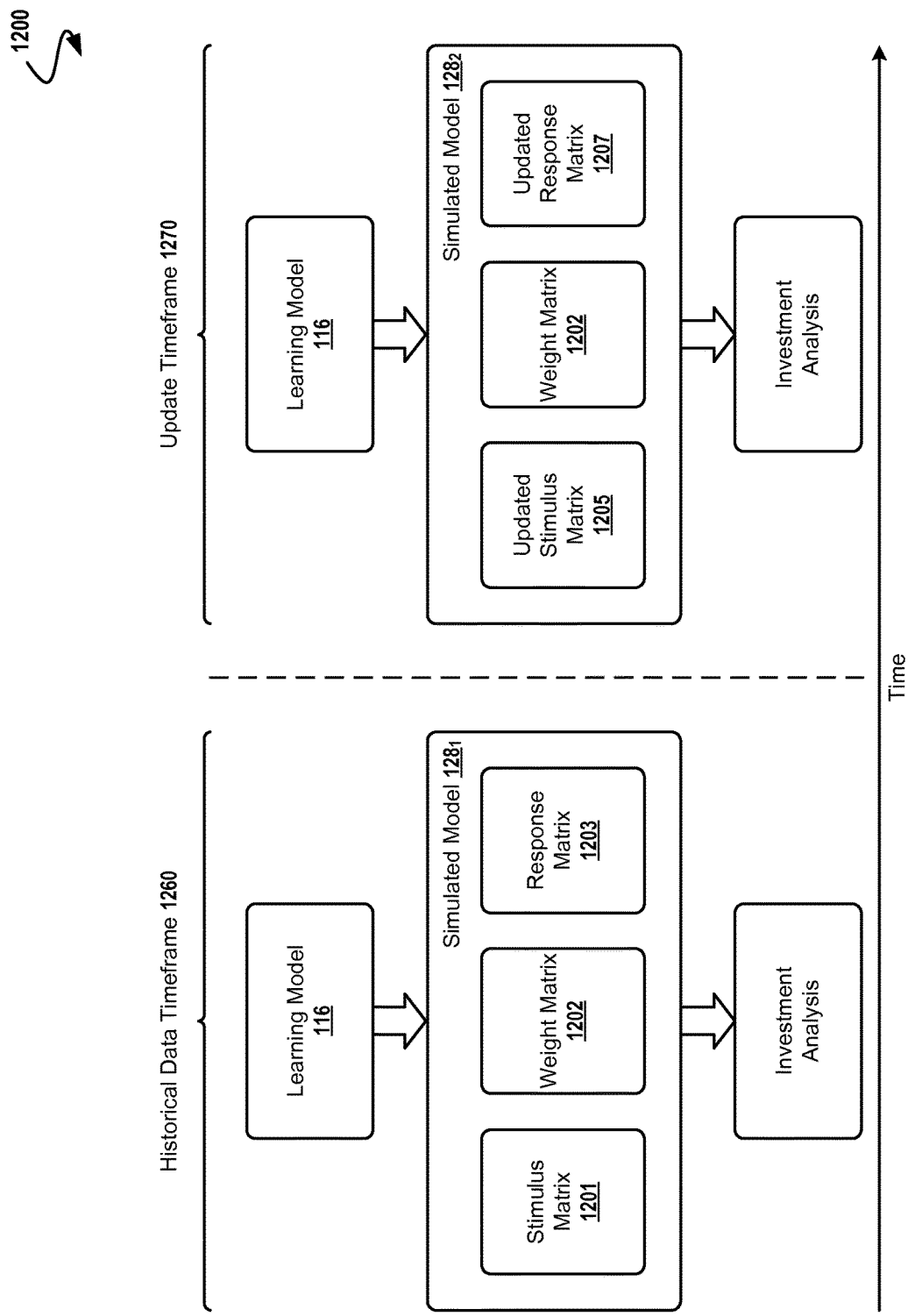
FIG. 12 depicts timing regimes used in systems for performing interactive updates to a precalculated cross-channel predictive model, according to some embodiments.

FIG. 12 depicts timing regimes used in systems for performing interactive updates to a precalculated cross-channel predictive model.

The shown plot depicts a time continuum over which is superimposed a historical data timeframe 1260 and an update timeframe 1270. In both timeframes a learning model 116 is used to generate a simulated model (see FIG. 1A, and see FIG. 1B). In the historical data timeframe, the simulated model 128₁ is shown to include stimulus matrix 1201, weight matrix 1202, and response matrix 1203. The weight matrix 1202 can be an array-like representation of the weight matrix 1002 (see FIG. 10). In the shown update timeframe 1270, the simulated model 128₂ is shown to include updated stimulus matrix 1205, weight matrix 1202, and an updated response matrix 1207. The shown partitioning (e.g., where the simulated model includes an updated stimulus matrix 1205, a weight matrix 1202, and an updated response matrix 1207) depicts merely one possible partitioning. The data comprising the updated stimulus matrix, the weight matrix, and the updated response matrix can be partitioned elsewhere other than within the simulated model 128₂.

In the time regimes shown, the simulated models (e.g., simulated model 128₁ and simulated model 128₂) derive at least in part from a learning model 116 and derive at least in part from the predictive model 124 (see FIG. 1A and FIG. 1B). In some settings, generation of the learning model and of the predictive model is a time consuming and computer resource-intensive process. For operating in the update timeframe 1270, a fast update technique is used so as to facilitate interactive updates to the predictive model.

As further described hereunder, some techniques use interactive user interfaces to capture updated stimulus and updated responses which are then applied a precalculated simulated model (e.g., simulated model 128₁) to generate an updated simulated model (e.g., simulated model 128₂), which in turn is used to facilitate investment analysis. In this and other embodiments, the application of updated stimulus is applied in real-time to the historical data of the stimulus matrix 1201 to generate updated stimulus matrix 1205, and the application of updated responses is applied in real-time to the historical data of the response matrix 1203 to generate an updated response matrix 1207.

The aforementioned updated stimulus matrix and updated response matrix can be captured from a user using any known technique (e.g., see FIG. 13). In some cases, an updated stimulus matrix and updated response matrix can represented as one or more vectors. One possible technique for representing an updated stimulus matrix and an updated response matrix includes representation in the form of a vector comprising a time series of scalars. Such a representation and corresponding meaning is presently discussed.

Figure 13A:
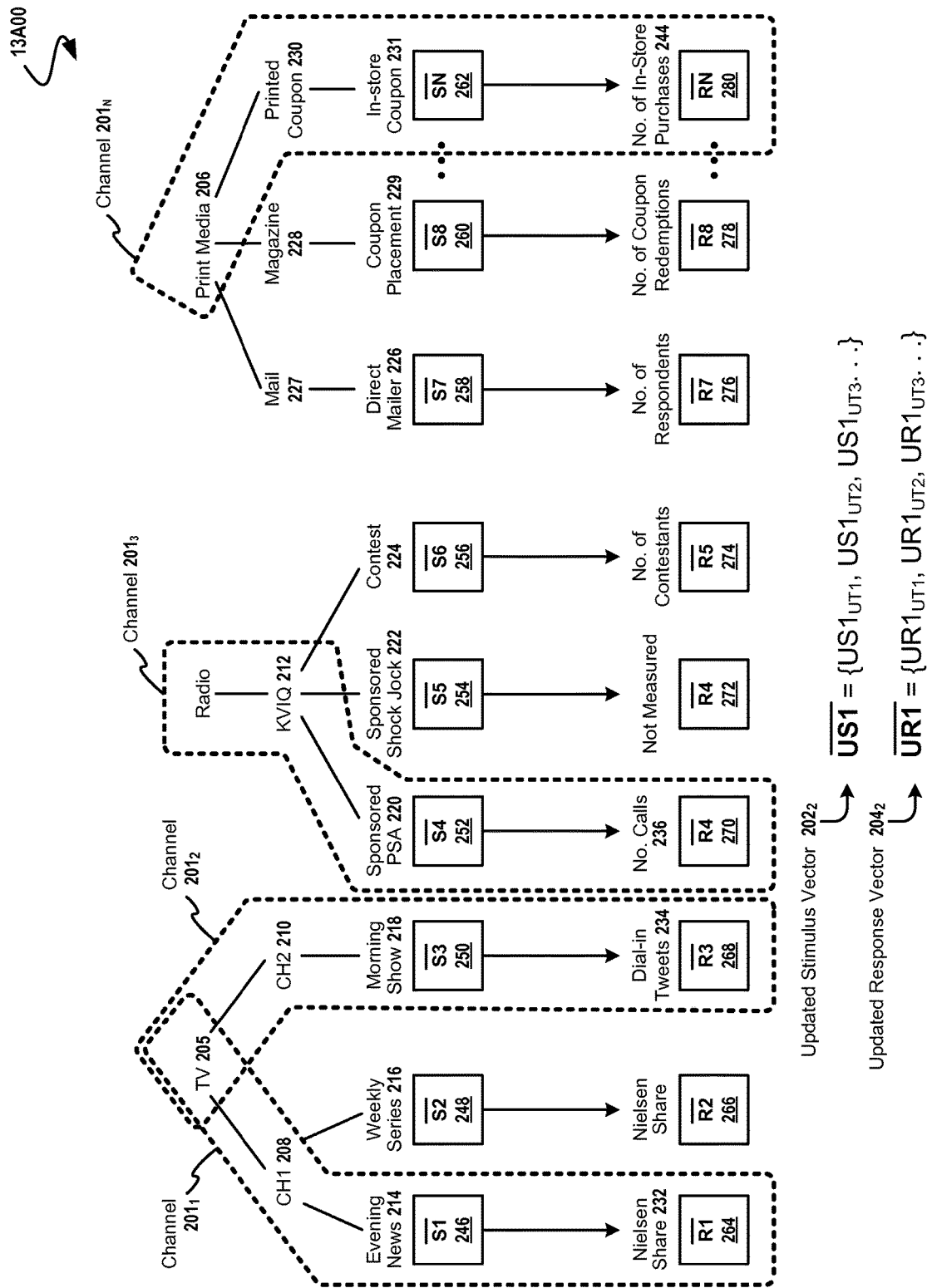
FIG. 13A is a chart depicting updated vectors formed from a time-series of scalars as used for forming updated true scores when performing interactive updates to a precalculated cross-channel predictive model, according to some embodiments.

FIG. 13A is a chart depicting updated vectors formed from a time-series of scalars as used for forming updated true scores when performing interactive updates to a pre-calculated cross-channel predictive model.

Vectors formed from a time-series of scalars is earlier discussed as pertaining to FIG. 2. The marketing channels (e.g., marketing channel 201₁, marketing channel 201₂, etc.) perform various marketing functions by accepting various stimulus (e.g., dollars to place TV ads) and returning various responses (e.g., Nielsen Share 232). The stimulus might come in the form of a time-series of TV spots (e.g., Evening News 214 spots for a first week, then Evening News spots for a second week, etc.). Such vectors can be used to form the learning model, and such vectors or variations thereof can be used in the simulated models (e.g., simulated model 126₁, simulated model 126₂, etc.). Moreover, in an update timeframe 1270, an updated stimulus vector 202₂ and an updated response vector 204₂ can be represented (e.g., vector US1 or vector UR1, etc.) comprising any portions of a time series of updated stimulus scalars that occur at updated times. In this example, the updated stimulus vector US1 comprises updated stimulus scalars captured for updated times$_{UT1}$, $_{UT2}$, etc., as shown.

FIG. 13B depicts an interactive user interface for capturing updated vectors formed from a time-series of updated scalars. As an option, one or more instances of interactive user interface 13B00 or any aspect thereof may be implemented in the context of the architecture and functionality of the embodiments described herein. Also, the interactive user interface 13B00 or any aspect thereof may be implemented in any desired environment.

As shown, the interactive user interface 13B00 accepts inputs in the form of updated times (e.g., the shown week-by-week granularity 1302). For a given time period (e.g., a week) the corresponding stimulus for that period is captured in the form of a stimulus value for a particular channel (e.g., see stimulus by channel 1304). Also, for a given time period (e.g., a week) the corresponding response for that period is captured in the form of a response value for a particular channel (e.g., see response by channel 1306).

FIG. 14 depicts a diagrammatic representation 1400 of a weight matrix as used in calculating true scores. As earlier indicated, the weight matrix might have been calculated in an earlier time period (e.g., in a historical data timeframe 1260), and can be used in a simulated model. In the shown embodiment, the matrix comprises a two-dimensional array of N stimulus channels (e.g., S1, S2, S3, S4, . . . SN) and N response channels (e.g., R1, R2, R3, R4, . . . RN). Each cell of the array comprises a weight value (e.g., WS1R1, WS2R1, etc.). The aforementioned weight values may have been calculated in weighting and filtering operations such as earlier shown and described as pertaining to FIG. 10.

Figure 15:
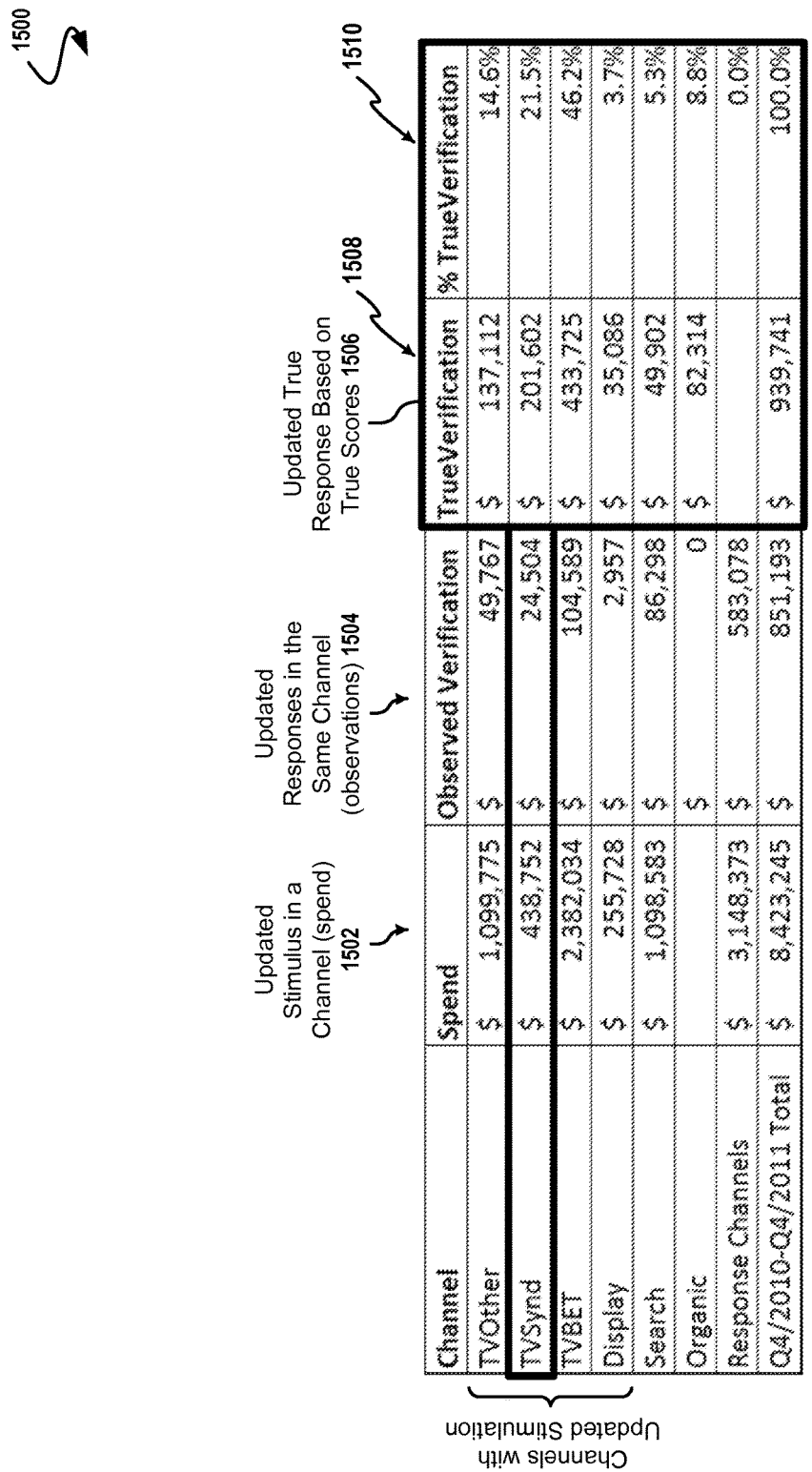
FIG. 15 depicts an updated true metrics report based on updated true scores that have been calculated after performing interactive updates to a precalculated cross-channel predictive model, according to some embodiments.

FIG. 15 depicts an updated true metrics report 1500 based on updated true scores that have been calculated after performing interactive updates to a precalculated cross-channel predictive model.

The shown updated true metrics report 1500 depicts the cross-channel impact of marketing stimulus. Depiction of cross-channel impacts facilitates quantifying, comparing and understanding the extent of influence of one channel over another channel. Such quantifications and comparisons can be used to form hypotheses pertaining to how an increase or decrease in marketing stimulation on a given channel would affect the responses obtained through another channel. Some embodiments of reports are earlier shown and described as pertaining to FIG. 11. In particular, the embodiment of FIG. 11 depicts a reports based on historical data (e.g., data collected that corresponds to stimulus and response measurements for a time period in a period in the past (e.g., historical data timeframe 1260).

In some use cases, certain stimulus and response from some channels can be known (e.g., recorded, measured, collected, etc.) for a more recent time period (e.g., update timeframe 1270).

What is desired is to apply the stimulus and response from a more recent time period over a model built on the historical data. In such a use case, a user interface takes in "live inputs" (e.g., updated known stimuli 110₂ and updated known responses 112₂) as pertaining to the more recent time and incorporates the live inputs into the historical model to calculate cross-channel impacts during a particular period, possibly including the recent time period as well as any portion of the time period covering the historical model.

For instance, the user can provide inputs at the channel levels for any number of weeks starting with the date for which the historical period ends and up through a current date. In the event that the time period of interest corresponds to timeframes that occur after the date when the historical period ends, then the results displayed comport with updated true metrics report 1500.

As shown, the updated true metrics report depicts updated stimulus through various channels (e.g., see updated stimulus in a channel 1502) as well as updated responses (e.g., updated responses in the same channel 1504). The cross-channel effects are depicted as updated true responses based updated true scores 1506, which can be depicted as an absolute number (e.g., true verification 1508) or as a percentage of a total (e.g., see percent true verification 1510).

The example depicts the cross-channel effect of doubling the spending for the channel "TVSynd". Specifically, the spend on "TVSynd" was $219,376 in the historical period (see FIG. 11), which is increased to $438,752 (see updated stimulus in a channel 1502). The observed verification of that spend also doubled (see updated response in the same channel 1504), and the true verification (see updated true response based on true scores 1506) also doubled, suggesting that saturation in this channel had still not been observed, even though spending in this channel had doubled.

Additional Practical Application Examples

Figure 16:
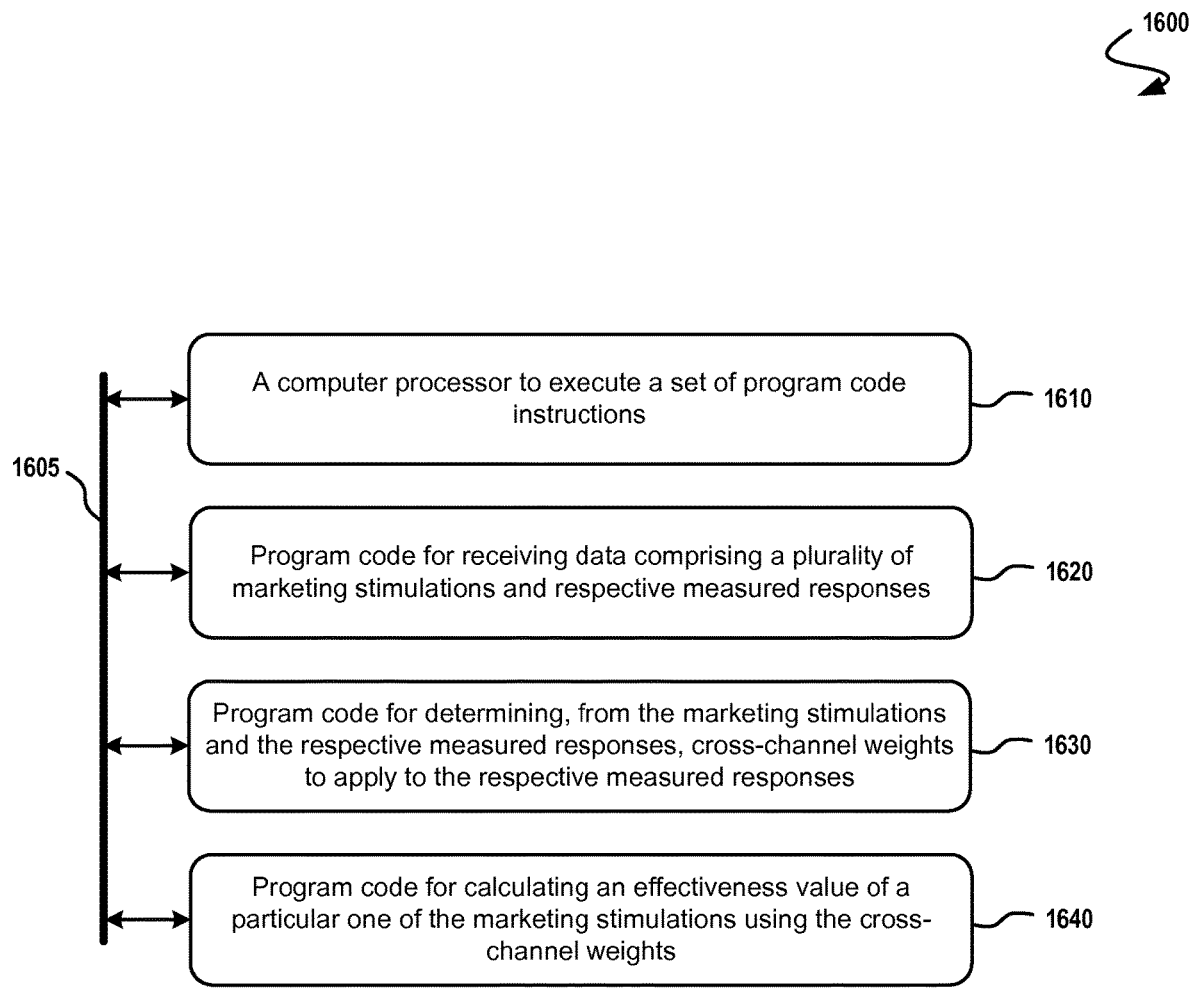
FIG. 16 is a block diagram of a system for optimizing media spend using a cross-channel predictive model, according to some embodiments.

FIG. 16 is a block diagram of a system for optimizing media spend using a cross-channel predictive model, according to some embodiments. As an option, the present system 1600 may be implemented in the context of the architecture and functionality of the embodiments described herein. Of course, however, the system 1600 or any operation therein may be carried out in any desired environment.

As shown, system 1600 comprises at least one processor and at least one memory, the memory serving to store program instructions corresponding to the operations of the system. As shown, an operation can be implemented in whole or in part using program instructions accessible by a module. The modules are connected to a communication path 1605, and any operation can communicate with other operations over communication path 1605. The modules of the system can, individually or in combination, perform method operations within system 1600. Any operations performed within system 1600 may be performed in any order unless as may be specified in the claims.

The embodiment of FIG. 16 implements a portion of a computer system, shown as system 1600, comprising a computer processor to execute a set of program code instructions (see module 1610) and modules for accessing memory to hold program code instructions to perform: receiving data comprising a plurality of marketing stimulations and respective measured responses (see module 1620); determining, from the marketing stimulations and the respective measured responses, cross-channel weights to apply to the respective measured responses (see module 1630); and calculating an effectiveness value of a particular one of the marketing stimulations using the cross-channel weights (see module 1640).

Figure 17:
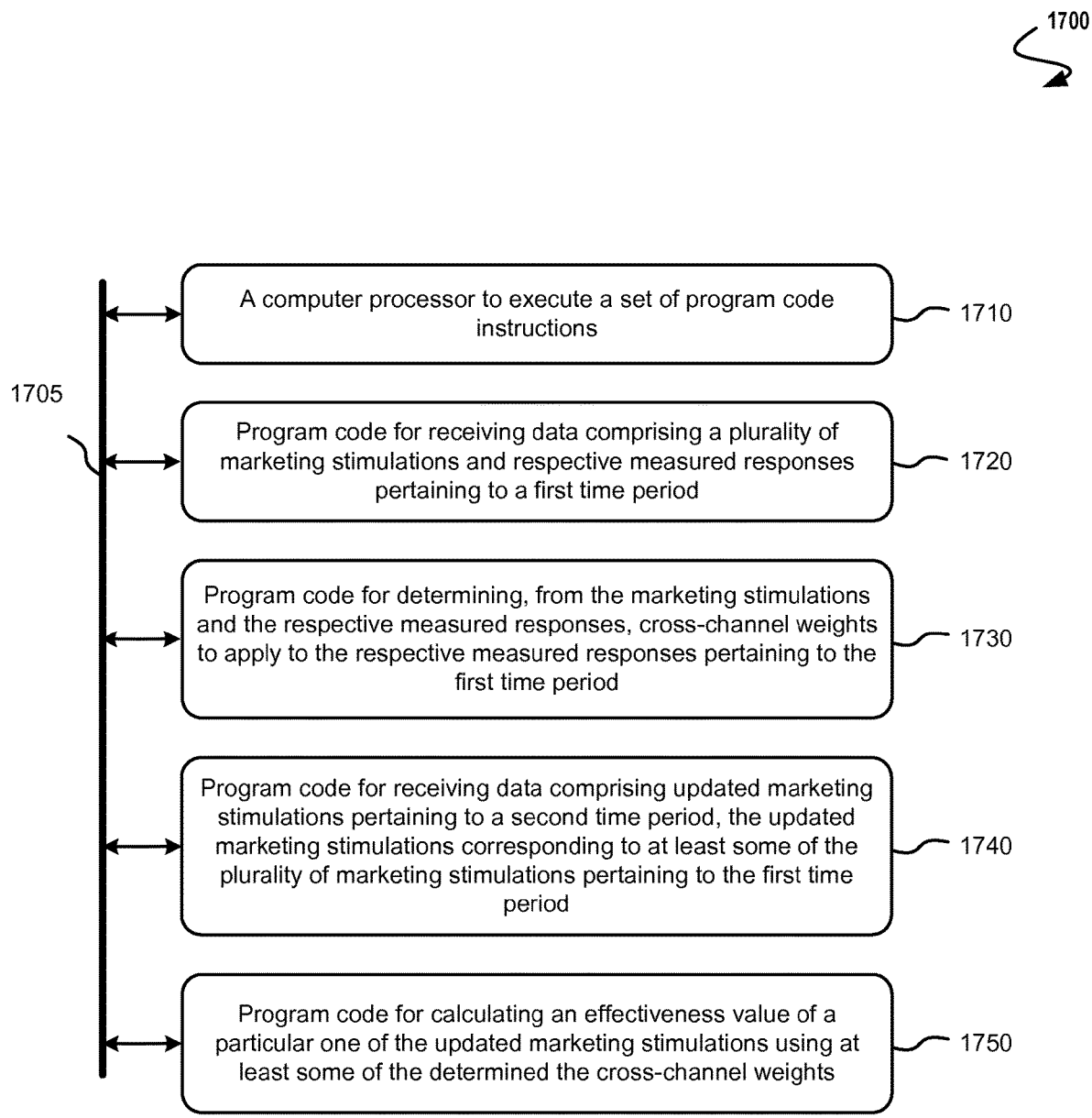
FIG. 17 is a block diagram of a system for performing interactive updates to a precalculated cross-channel predictive model, according to some embodiments.

FIG. 17 is a block diagram of a system to perform certain functions of a computer system. As an option, the present system 1700 may be implemented in the context of the architecture and functionality of the embodiments described herein. Of course, however, the system 1700 or any operation therein may be carried out in any desired environment.

As shown, system 1700 comprises at least one processor and at least one memory, the memory serving to store program instructions corresponding to the operations of the system. As shown, an operation can be implemented in whole or in part using program instructions accessible by a module. The modules are connected to a communication path 1705, and any operation can communicate with other operations over communication path 1705. The modules of the system can, individually or in combination, perform method operations within system 1700. Any operations performed within system 1700 may be performed in any order unless as may be specified in the claims.

The embodiment of FIG. 17 implements a portion of a computer system, shown as system 1700, comprising a computer processor to execute a set of program code instructions (see processor module 1710) and modules for accessing memory to hold program code instructions to perform: receiving data comprising a plurality of marketing stimulations and respective measured responses pertaining to a first time period (see input module 1720); forming a simulation module and determining, from the marketing stimulations and the respective measured responses, cross-channel weights to apply to the respective measured responses pertaining to the first time period (see simulator generation module 1730); receiving data comprising updated marketing stimulations pertaining to a second time period, the updated marketing stimulations corresponding to at least some of the plurality of marketing stimulations pertaining to the first time period (see update module 1740); and calculating an effectiveness value of a particular one of the updated marketing stimulations using at least some of the determined cross-channel weights (see calculation module 1750).

In exemplary situations, the aforementioned second time period begins later than the first time period ends, however it is possible that the second time period overlaps partially with the first time period. As is now understood, in order to accomplish real-time updates, and for other reasons, the cross-channel weights to apply to the respective measured responses pertaining to the first time period need not be modified when calculating the effectiveness value of the updated marketing stimulations. Strictly as an example, the time regimes of FIG. 12, and more particularly, the weight matrix 1202 formed using historical data of the stimulus matrix 1201 and the response matrix 1203, is not modified when calculating the effectiveness value using the updated marketing stimulations.

A marketing channel can comprise "online" marketing channels such as display advertising, and/or "offline" marketing channels such as television advertising, thus updated marketing stimulations comprise any combinations of display advertising spend, a number of direct mail pieces, a number of TV spots, a number of radio spots, a number of web impressions, and a number of coupons printed, a cost for display advertising, etc., and some embodiments use the learning model to predict a portion of a response in a second channel (e.g., a number of online sales recorded) resulting from a stimulus in a first channel (e.g., a display advertising spend or spend rate).

System Architecture Overview

Figure 18:
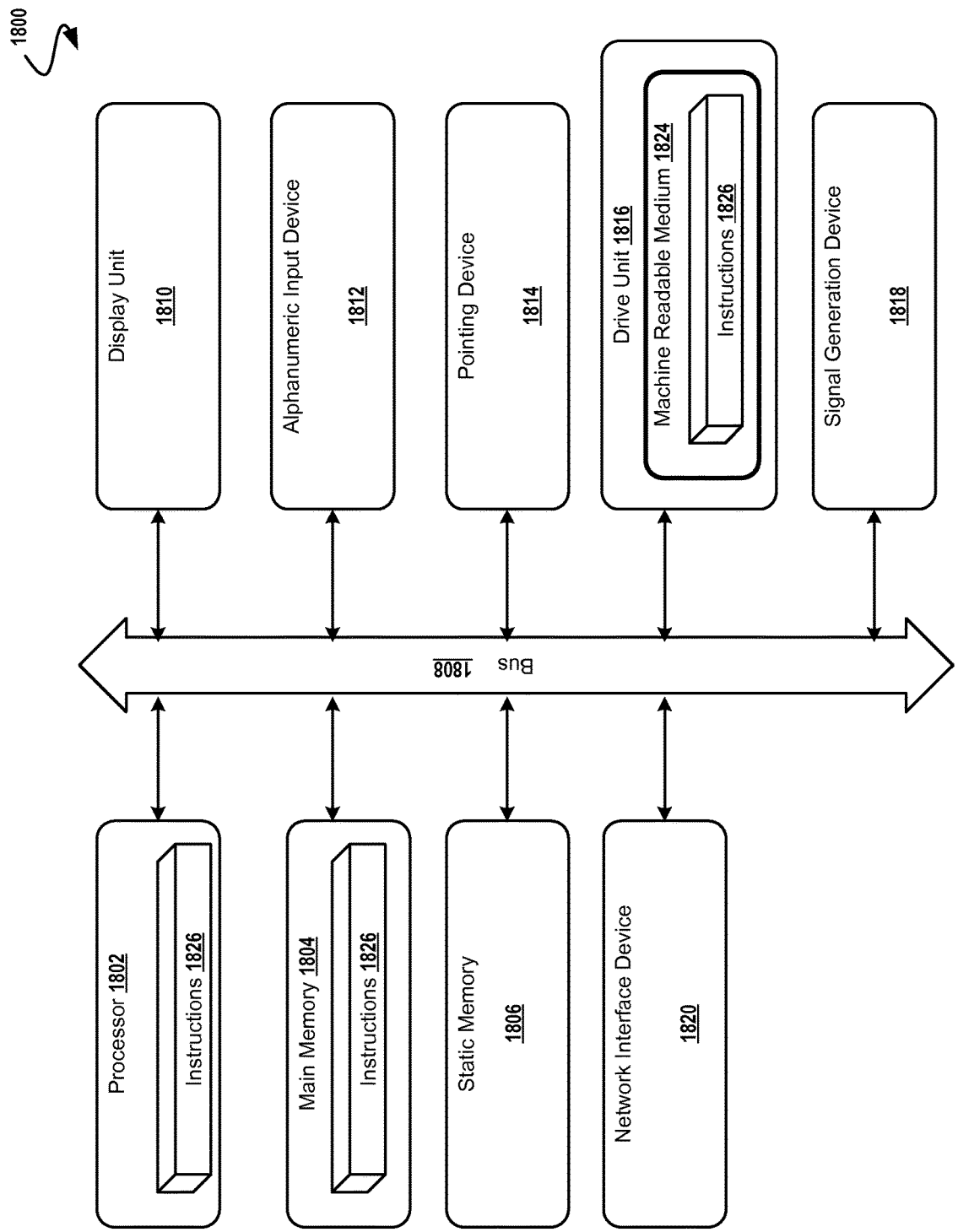
FIG. 18 depicts a block diagram of an instance of a computer system suitable for implementing an embodiment of the present disclosure.

FIG. 18 depicts a block diagram of an instance of a computer system 1800 within which a set of instructions, for causing the machine to perform any one of the methodologies discussed above, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a cursor control device 1814 (e.g., a mouse), a disk drive unit 1816, a signal generation device 1818 (e.g., a speaker), and a network interface device 1820.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1820.

It is to be understood that various embodiments may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; or any other type of non-transitory media suitable for storing or transmitting information.

A module as used herein can be implemented using any mix of any portions of the system memory, and any extent of hard-wired circuitry including hard-wired circuitry embodied as a processor 1802.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer-implemented method comprising:

training, with machine-learning techniques, a learning model by correlating, for a plurality of stimulation vectors corresponding to a plurality of marketing channels of an advertising campaign, a first portion of time series stimulus data with a first portion of time series response data across the plurality of marketing channels of the advertising campaign, the first portion of time series response data measuring responses to the first portion of time series stimulus data by a plurality of users exposed to marketing media represented in the first portion of time series stimulus data, the correlating including exogenous variables that attenuate effects independent from the first portion of time series stimulus data, the correlating to emphasize more recent entries over older entries in the first portion of time series stimulus data and the first portion of time series response data;

forming, by executing a plurality of simulations with the learning model, a weight matrix to be utilized by a first simulated model, the weight matrix including weights corresponding to effects in a first portion of the plurality of marketing channels of the advertising campaign caused by stimulus in a second portion of the plurality of marketing channels of the advertising campaign, the plurality of simulations including:

performing simulations at values through a sweep of a range of potential stimulus values for the first portion of time series stimulus data, the range of potential stimulus values associated with an increase or decrease in marketing media spend relative to a baseline value;

predicting, based on the simulations at the values through the sweep of the range of potential stimulus values, a plurality of responses across the plurality of marketing channels of the advertising campaign; and generating, for the simulations at the values through the sweep of the range of potential stimulus values, a plurality of weight values representative of the effect of the potential stimulus values on the plurality of responses;

collecting, via an interactive user interface, a second portion of time series stimulus data and a second portion of time series response data for the plurality of marketing channels of the advertising campaign;

reducing computational resource consumption associated with generating an updated version of at least one of the learning model or the first simulated model by applying the second portion of time series stimulus data and the second portion of time series response data to the first simulated model to generate a second simulated model; and executing, with the second simulated model, a simulation on a user provided scenario of the advertising campaign, the user provided scenario entered using the interactive user interface, the user provided scenario entered by configuring at least one change in a marketing media spend value of a first marketing channel of the plurality of marketing channels of the advertising campaign, the simulation to determine an effectiveness value to attribute to the at least one change in the marketing media spend value relative to other marketing media spend values represented in stimuli values for other marketing channels of the plurality of marketing channels of the advertising campaign, the effectiveness value determined based on the weight matrix and representative of an effect of the first marketing channel on the other marketing channels of the advertising campaign.

2. The computer-implemented method as set forth in claim 1, wherein the effectiveness value is displayed as a percentage.

3. The computer-implemented method as set forth in claim 1, wherein at least one of the first portion of time series stimulus data or the second portion of time series stimulus data includes at least one of, an advertising spend, a number of direct mail pieces, a number of TV spots, a number of radio spots, a number of web impressions and a number of coupons printed, and at least one of the first portion of time series response data or the second portion of time series response data includes at least one of a number of calls into a call center, a number of clicks on an impression, or a number of coupon redemptions.

4. The computer-implemented method as set forth in claim 1, further including generating a report based on the effectiveness value that quantifies a return on investment for at least one of the plurality of marketing channels that accounts for cross-channel effects.

5. A computer program product embodied in a non-transitory computer readable medium, the non-transitory computer readable medium having stored thereon a sequence of instructions which, when executed by a processor causes the processor to execute a process, the process comprising:

training, with machine-learning techniques, a learning model by correlating, for a plurality of stimulation vectors corresponding to a plurality of marketing channels of an advertising campaign, a first portion of time series stimulus data with a first portion of time series response data across the plurality of marketing channels of the advertising campaign, the first portion of time series response data measuring responses to the first portion of time series stimulus data by a plurality of users exposed to marketing media represented in the first portion of time series stimulus data, the correlating including exogeneous variables that attenuate effects independent from the first portion of time series stimulus data, the correlating to emphasize more recent entries over older entries in the first portion of time series stimulus data and the first portion of time series response data;

forming, by executing a plurality of simulations with the learning model, a weight matrix to be utilized by a first simulated model, the weight matrix including weights corresponding to effects in a first portion of the plurality of marketing channels of the advertising campaign caused by stimulus in a second portion of the plurality of marketing channels of the advertising campaign, the plurality of simulations including:
  performing simulations at values through a sweep of a range of potential stimulus values for the first portion of time series stimulus data, the range of potential stimulus values associated with an increase or decrease in marketing media spend relative to a baseline value;
  predicting, based on the simulations at the values through the sweep of the range of potential stimulus values, a plurality of responses across the plurality of marketing channels of the advertising campaign; and
  generating, for the simulations at the values through the sweep of the range of potential stimulus values, weight values representative of the effect of the potential stimulus values on the plurality of responses;

collecting, via an interactive interface, a second portion of time series stimulus data and a second portion of time series response data for the plurality of marketing channels of the advertising campaign;

reducing computational resource consumption associated with generating an updated version of at least one of the learning model or the first simulated model by applying the second portion of time series stimulus data and the second portion of time series response data to the first simulated model to generated a second simulated model; and executing, with the second simulated model, a simulation on a user provided scenario of the advertising campaign, the user provided scenario entered using the interactive interface, the user provided scenario entered by configuring at least one change in a marketing media spend value of a first marketing channel of the plurality of marketing channels of the advertising campaign, the simulation to determine an effectiveness value to attribute to the at least one change in the marketing media spend value relative to other marketing spend values represented in stimuli values for other marketing channels of the plurality of marketing channels of the advertising campaign, the effectiveness value determined based on the weight matrix and representative of an effect of the first marketing channel on the other marketing channels of the advertising campaign.

6. The computer program product as set forth in claim 5, wherein the effectiveness value is displayed as a percentage.

7. The computer program product as set forth in claim 5, wherein at least one of the first portion of time series stimulus data or the second portion of time series stimulus data includes at least one of, an advertising spend, a number of direct mail pieces, a number of TV spots, a number of radio spots, a number of web impressions and a number of coupons printed, and at least one of the first portion of time series response data or the second portion of time series response data includes at least one of a number of calls into a call center, a number of clicks on an impression, or a number of coupon redemptions.

8. The computer program product as set forth in claim 5, wherein the process further includes generating a report based on the effectiveness value that quantifies a return on investment for at least one of the plurality of marketing channels that accounts for cross-channel effects.

9. A computer system comprising:
  a computer processor to execute a set of program code instructions; and
  a memory to store the set of program code instructions, in which the set of program code instructions comprises program code to perform:
    training, with machine-learning techniques, a learning model by correlating, for a plurality of stimulation vectors corresponding to a plurality of marketing channels of an advertising campaign, a first portion of time series stimulus data with a first portion of time series response data across the plurality of marketing channels of the advertising campaign, the first portion of time series response data measuring responses to the first portion of time series stimulus data by a plurality of users exposed to marketing media represented in the first portion of time series stimulus data, the correlating including exogeneous variables that attenuate effects independent from the first portion of time series stimulus data, the correlating to emphasize more recent entries over older entries in the first portion of time series stimulus data and the first portion of time series response data;
    forming, by executing a plurality of simulation with the learning model, a weight matrix to be utilized by a first simulated model, the weight matrix including weights corresponding to effects in a first portion of the plurality of marketing channels of the advertising campaign caused by stimulus in a second portion of the plurality of marketing channels of the advertising campaign, the plurality of simulations including:
      performing simulations at values through a sweep of a range of potential stimulus values for the first portion of time series stimulus data, the range of potential stimulus values associated with an increase or decrease in marketing media spend relative to a baseline value;
      predicting, based on the simulations at the values through the sweep of the range of potential stimulus values, a plurality of responses across the plurality of marketing channels of the advertising campaign;
      generating, for the simulations at the values through the sweep of the range of potential stimulus values, weight values representative of the effect of the potential stimulus values on the plurality of responses;
    collecting, via an interactive user interface, a second portion of time series stimulus data and a second portion of time series response data for the plurality of marketing channels of the advertising campaign;

reducing computational resource consumption associated with generating an updated version of at least one of the learning model or the first simulated model by applying the second portion of time series stimulus data and the second portion of time series response data to the first simulated model to generate a second simulated model; and executing, with the second simulated model, a simulation on a user provided scenario of the advertising campaign, the user provided scenario entered using the interactive user interface, the user provided scenario entered by configuring at least one change in a marketing media spend value of a first marketing channel of the plurality of marketing channels of the advertising campaign, the simulation to determine an effectiveness value to attribute to the at least one change in the marketing media spend value relative to other marketing media spend values represented in stimuli values for other marketing channels of the plurality of marketing channels of the advertising campaign, the effectiveness value determined based on the weight matrix and representative of an effect of the first marketing channel on the other marketing channels of the advertising campaign.

10. The computer system as set forth in claim 9, wherein the effectiveness value is displayed as a percentage.

11. The computer system as set forth in claim 9, wherein at least one of the first portion of time series stimulus data or the second portion of time series stimulus data in the stimulation vectors includes at least one of, an advertising spend, a number of direct mail pieces, a number of TV spots, a number of radio spots, a number of web impressions and a number of coupons printed, and at least one of the first portion of time series response data or the second portion of time series response data includes at least one of a number of calls into a call center, a number of clicks on an impression, or a number of coupon redemptions.

12. The computer-implemented method of claim 1, further including validating the learning model by executing a validation simulation, the validation simulation including determining predicted response vectors for a portion of historical stimulus data and comparing the predicted response vectors to historical response vectors associated with the portion of historical stimulus data.

13. The computer-implemented method of claim 12, further including determining whether the predicted response vectors satisfy a validity threshold with respect to the historical response vectors associated with the portion of historical stimulus data.

14. The computer-implemented method of claim 13, wherein, in response to the predicted response vectors not satisfying the validity threshold, the learning model is subjected to further training.

15. The computer-implemented method of claim 1, further including removing noisy weight values by:

comparing the plurality of weight values to a threshold; and designating ones of the plurality of weight values which exceed the threshold as true score values.

16. The computer-implemented method of claim 1, wherein the correlating is to emphasize the more recent entries over the older entries based on an exponentially decaying model.

17. The computer-implemented method of claim 1, wherein the first simulated model includes the first portion of time series stimulus data, the first portion of time series response data, and the weight matrix, and applying the second portion of time series stimulus data and the second portion of time series response data to the first simulated model includes:

updating the first portion of time series stimulus data with the second portion of time series stimulus data; and updating the first portion of time series response data with the second portion of time series response data with the second portion of time series response data.

18. The computer-implemented method of claim 1, wherein:

the first portion of time series stimulus data and the first portion of time series response data correspond to first known stimuli and first known responses collected at a first time; and the second portion of time series stimulus data and the second portion of time series response data correspond to second known stimuli and second known responses collected at a second time, the first time earlier than the second time.

19. The computer program product as set forth in claim 5, wherein the first simulated model includes the first portion of time series stimulus data, the first portion of time series response data, and the weight matrix, and applying the second portion of time series stimulus data and the second portion of time series response data to the first simulated model includes:

updating the first portion of time series stimulus data with the second portion of time series stimulus data; and updating the first portion of time series response data with the second portion of time series response data with the second portion of time series response data.

20. The computer system of claim 9, wherein the first simulated model includes the first portion of time series stimulus data, the first portion of time series response data, and the weight matrix, and applying the second portion of time series stimulus data and the second portion of time series response data to the first simulated model includes:

updating the first portion of time series stimulus data with the second portion of time series stimulus data; and updating the first portion of time series response data with the second portion of time series response data with the second portion of time series response data.

* * * * *